United States Patent
Phillips et al.

(10) Patent No.: US 11,080,795 B1
(45) Date of Patent: Aug. 3, 2021

(54) IDENTIFYING AND UTILIZING THE AVAILABILITY OF ENTERPRISE RESOURCES

(71) Applicant: Capital One Services, LLC, McLean, VA (US)

(72) Inventors: Jeremy Phillips, Brooklyn, NY (US); Joseph Goldstein, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/743,373

(22) Filed: Jan. 15, 2020

(51) Int. Cl.
*G06Q 50/10* (2012.01)
*G06Q 40/00* (2012.01)

(52) U.S. Cl.
CPC .................................. *G06Q 40/128* (2013.12)

(58) Field of Classification Search
None
See application file for complete search history.

(56) References Cited

U.S. PATENT DOCUMENTS

| | | | |
|---|---|---|---|
| 8,682,754 B1* | 3/2014 | Chapman | G06Q 40/12 705/30 |
| 2009/0024540 A1* | 1/2009 | Ryder | G06Q 40/06 705/36 R |

OTHER PUBLICATIONS

Collier, Dubal and Carter, Labor Platforms and Fig Work: The failure to Regulate, 29 pages, published Sep. 2017 and downloaded from https://escholarship.org/uc/item/4c88672z. (Year: 2017).*

* cited by examiner

*Primary Examiner* — Paul Danneman
(74) *Attorney, Agent, or Firm* — Kacvinsky Daisak Bluni PLLC

(57) ABSTRACT

Entities may reference ledgers in order to better understand a historic use and/or status of an account. For example, a user may track historic spending or received payments based on referencing a ledger, or an enterprise may check a balance of an account for a user based on a ledger. However, the utility of ledgers in estimating an amount of funds available for a user's use is limited. Embodiments of a financial analyzer as described herein may provide entities with estimations of finances that include contributions from one or multiple income sources, including irregular sources. Some embodiments may provide recommendations to customers to meet needs based on a financial estimation.

15 Claims, 11 Drawing Sheets

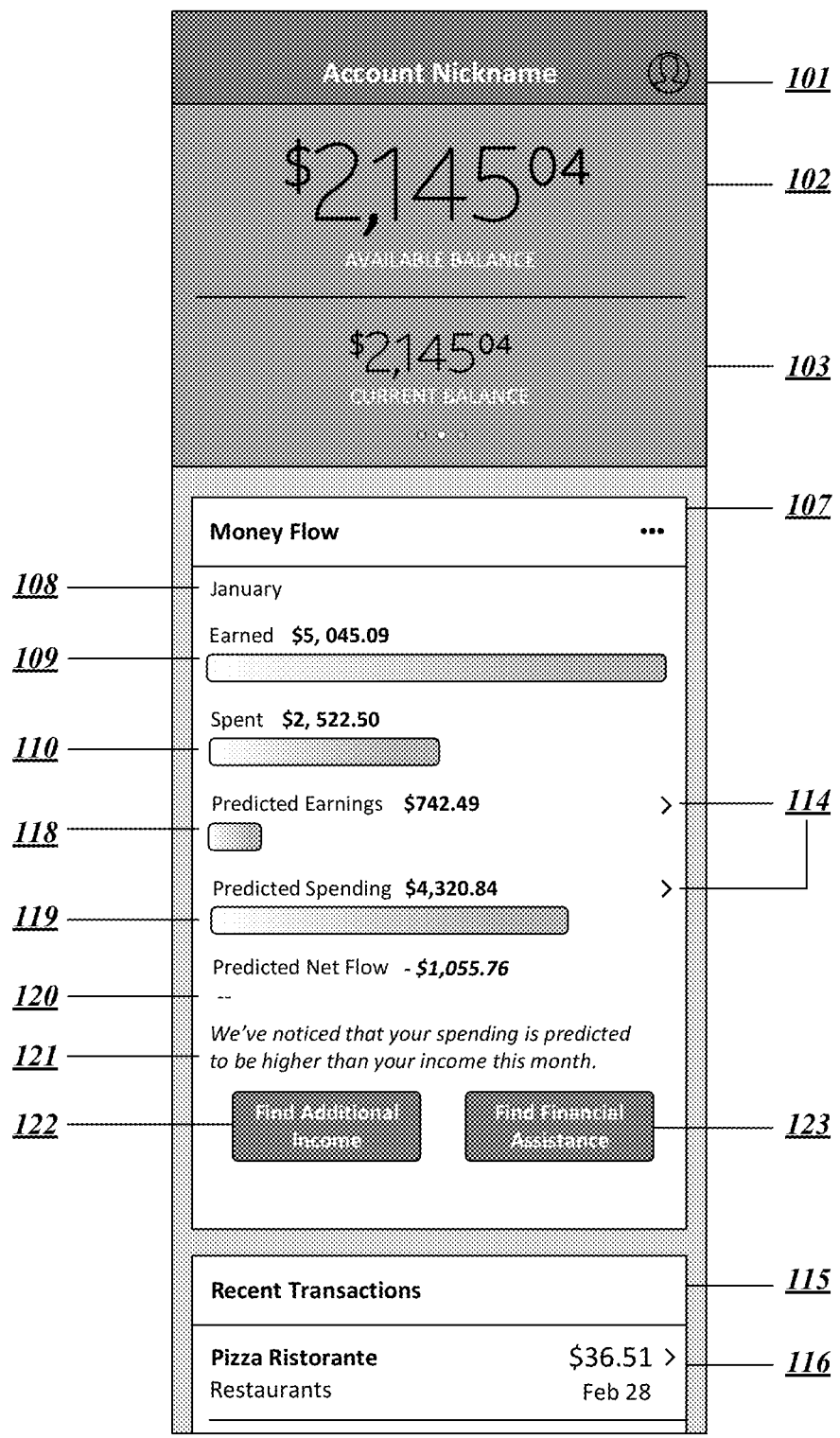

100G

100H

100I

100J

200

300A

500

600

IDENTIFYING AND UTILIZING THE AVAILABILITY OF ENTERPRISE RESOURCES

BACKGROUND

Transaction records associated with an account may be stored in ledgers. A ledger may record payments and/or deductions of funds to an account balance over time. Entities associated with an account may check an account balance to understand an amount of funds available in the account. Entities may refer to a ledger to understand historic transactions associated with the account.

BRIEF DESCRIPTION OF THE DRAWINGS

FIGS. 1A-J depicts an exemplary user interface according to one or more embodiments described herein.

DETAILED DESCRIPTION

Figure 1A:
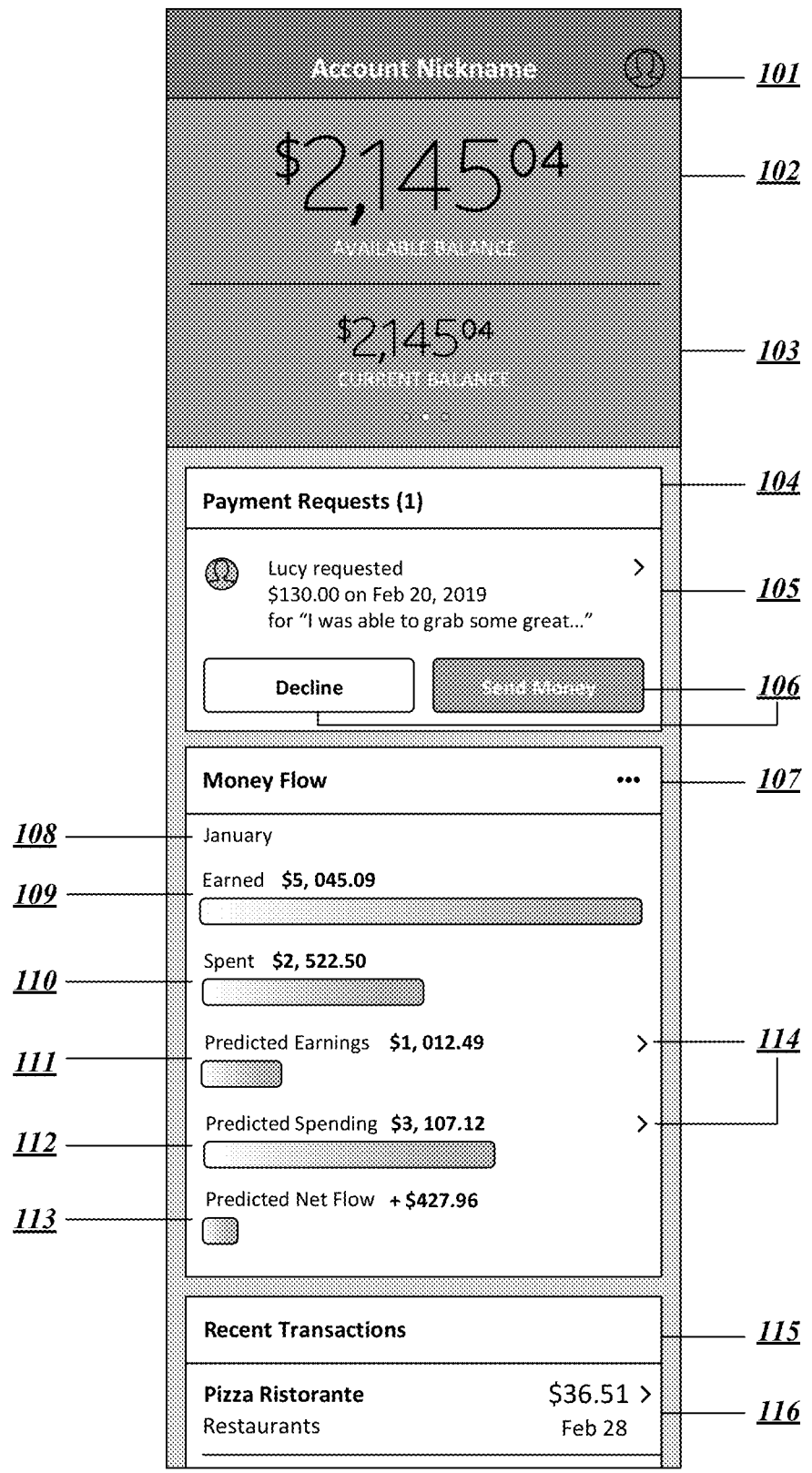

Entities may reference ledgers in order to better understand a historic use and/or status of an account. For example, a user may track historic spending or received payments based on referencing a ledger, or an enterprise may check a balance of an account for a user based on a ledger.

Ledgers may include records of transactions associated with a user and/or user account. Records in a ledger may include information such as a transaction amount, as well as other information useful for identifying the transaction. For example, transaction records may include an amount of funds associated with a transaction, transaction timestamps, parties associated with a transaction such as a payer and/or recipient, category of sale, and/or other information. In some embodiments, an enterprise may manage a ledger for a user in association with a user account. For example, an enterprise may be a bank, and a user may be a customer of the bank.

However, the utility of ledgers in estimating an amount of funds available for a user's use is limited.

An entity may only be able to understand an availability of funds in an account based on a manual analysis of historic records in ledgers, which can be time intensive and inconvenient. Understanding transaction patterns may require traversing through a table of records in a mailed ledger, a part purchase list accessed via a website, or an account ledger accessed through an application on a computer. Entities may need to sort historic transactions by various criteria, for example, by involved parties, by transaction type, and by time period. The effort and attention to minute detail may prevent a thorough understanding of historic transactions, which may hinder accurate estimations of available funds. For example, a user may forget to account for an upcoming recurring bill in estimating a percentage of funds available for casual spending from an account. In another example, a user may not have time to analyze historic transactions and so may not have any understanding of use of an account.

Furthermore, a ledger may not provide an accurate portrait of current funds available in an account. Insight that a customer can gain from existing ledgers is limited to already-processed transactions. Delayed expected transactions, transactions in a transit stage, and/or transactions completed after an update of a ledger may not appear in the ledger as viewable to entities, leaving entities with an incomplete understanding of a present status of an account.

Even if an entity is able to analyze historic transactions, they may be unable to reasonably estimate a state of an account based on the historic transactions. Historic transactions may be irregular. For example, income sources such as gig jobs, hourly jobs, and/or other task-based jobs may provide a user with irregular income and may not reliably deposit the same amount of funds into an account. A user may not have access to information about future income and/or expenses. For example, a user may not be aware of an upcoming auxiliary bonus from an employer. Accordingly, manual estimation of upcoming transactions may not be possible for humans based on historic transactions.

Additionally, or alternatively, entities may not be enabled to respond to an estimation of an account status. For example, a user may guess that future expenses may outweigh future income. However, the user may not know how much additional income may be necessary to cover upcoming costs, or the user may not know how to access necessary additional income. A customer may not be aware of potential income sources. Furthermore, a customer may not be aware of products available to mitigate income flow discrepancies. For example, a customer may not be aware that they may qualify for a short-term loan from a bank. In some embodiments, a customer may not be aware of services available to promote account stability and/or growth. For example, a customer may not know that a bank offers financial counseling.

Accordingly, entities may view tracking finances as a stress-filled chore. In view of the inaccuracies of with manual estimations and helplessness to properly respond to circumstances at the end, entities may associate negative emotions with tracking finances and/or avoid looking to their financial future altogether. As a result, entities may be even less prepared for their financial future. Furthermore, entities' perception of enterprises associated with their transactions may be hurt, negatively affecting the business of enterprises.

Given the above weaknesses and concerns, there is a need for an improved financial analyzer. One or more embodiments described herein may enable enterprises to provide at least one solution to one or more of the above problems. For example, embodiments may provide entities with estimations of finances that include contributions from one or multiple income sources, including irregular sources. Some embodiments may provide recommendations to customers to meet needs based on a financial estimation. Components described herein will therefore enable enterprises to provide entities with more holistic financial forecasts, to improve efficiency of financial forecasting, and/or to allow entities to access recommendations in new ways. Accordingly, in various embodiments, incorporation of multiple income sources in financial analyses and/or offerings of recommendations based on analysis of multiple income sources may be implemented in a practical application to increase capabilities and improve adaptability of enterprise systems as a whole.

One or more of the components or techniques described herein may be implemented via one or more computing devices, resulting in increased capability and improved functioning of the computer devices. Specific manners of automatically estimating financial forecasts, analyzing trends in customers' finances, and/or dynamically generating recommendations may be provided by the components described in various embodiments herein. In several embodiments, expected behaviors and behaviors involving the update and management of customer financial estimations and/or recommendations may be performed independently of software using the request management via familiar, user-friendly interface objects.

In various embodiments, components, techniques, or aspects described herein may be implemented as a set of rules that improve computer-related technology by allowing a function not previously performable by a computer that enables an improved technological result to be achieved. For example, generating an output comprising a product and/or employment recommendation based on a financial estimation made using multiple income sources may be an improved technological result. Furthermore, an improved technological result may be presenting and/or providing the recommendation to a user via a graphical user interface on a user's device.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Coupling of components will be understood to refer to the presence of wired connections, wireless connections, network connections, other connections, or a combination thereof between the components.

An entity may refer to an individual, a user, or an enterprise. An enterprise may be an entity or set of entities, such as a business or companies, that provides products such as goods or services. For example, a bank may be an enterprise. For the sake of simplicity, the disclosure may refer to enterprises and businesses interchangeably. It will be understood that enterprises other than businesses may employ one or more embodiments described herein. Additionally, the disclosure may refer to customers, clients, users, customer accounts, client accounts, user accounts, and/or accounts interchangeably. It will be understood that an individual may be a customer and/or a client of an enterprise. Additionally, or alternatively, an individual may be a user of a payment method and/or application associated with an enterprise. A customer, client, and/or user may be associated with an account associated with an enterprise. Embodiments are not limited in this context.

For the sake of simplicity, the disclosure may refer to accounts as being financial accounts and/or transactions as being financial transactions. However, it is understood that embodiments may pertain to other fields. For example, transactions may include non-monetary currencies, tokens, or other credits. Accounts may be any record or arrangement associated with a user and a corresponding transaction. Accordingly, a financial analyzer, as described herein, may be understood to be an appropriate currency state analyzer, wherein a currency state corresponds to a status and/or use of a respective body of credits.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1A depicts an exemplary user interface 100A according to one or more embodiments described herein. A business may provide a user with access to an account, services, and/or information via a user interface. A user account may include information relating to past transactions of the customer. The user interface may include an estimation of finances for the user. Embodiments are not limited in this context.

A user interface 101 may display information relating to a user account. A user interface may be associated with a website, an application, a web extension, or other program. For simplicity, the present disclosure will refer to a user interface with respect to an application, but functionality of components and/or techniques is not limited to this example. A user interface may be accessed via a computer such as a laptop, a desktop, a mobile device such as a mobile phone, or other computing device coupled to at least one monitor, input system, and/or memory. The user interface 101 may include information relating to funds associated with the user account. Funds may be physically and/or electronically maintained. For example, funds may be in a bank account, a digital wallet, a prepaid card, or other financial account. Funds may be in dollars, points, digital currency, or any other currency. The user interface 101 may display a balance of funds, such as an available balance 102 approved for immediate use and/or a total current balance 103 in an account.

In some embodiments, an application may be configured to allow withdrawals and/or deposits of funds into a fund balance. Deposits and/or withdrawals may be completed according to settings associated with an application and/or account. For example, a direct deposit system's information may be saved with settings for a user account. Alternatively, or additionally, user interface 101 may receive instructions to make withdrawals and/or deposits.

In some embodiments, a withdrawals and/or deposits of funds to a user's account may be enabled via an application from another user's account. For example, the application of user interface 101 may receive and/or display payment requests such as payment request 104. A payment request 104 may be a singular occurrence or a repeating event. Requests and/or deposits may be managed by the business managing the application, a third party, or a combination thereof.

Requests, such a payment request 104, may include information related to the request and/or deposit, such as information 105. Information related to a request and/or deposit may include an identifier for another involved account, such as a name and/or account identifier, a value associated with the request and/or deposit, a timestamp, and a note and/or comment provided by at least one user involved in the request and/or deposit. A user interface 101 may display aspects of information 105 in accordance with privacy practices agreed to by at least one user. For example, a name of an account associated with a request may be displayed, but not an account number.

A user interface 101 may receive an indication to accept or decline a request and/or deposit. For example, with respect to payment request 104, instructions to decline the request or to send funds to Lucy's account can be received at the user interface 101 via options 106. Upon receiving an indication of a selected option 106, an application may respectively decline or complete a payment request 104. In some embodiments, a completed request may be treated as a transaction.

A user interface 101 may display information relating to the flow of funds in and/or out of a financial account. For example, money flow 107 may include, with respect to a time frame 108, a measure of incoming funds and/or outgoing funds. Incoming funds for a time frame 108 may be displayed as earned funds 109. Outgoing funds for a time frame 108 may be displayed as spent funds 110. A time frame 108 may be determined by a default setting, selected from a plurality of set options, or customized (e.g., daily, weekly, bi-monthly, 60 days, quarterly, bi-annually, annually, etc.). A user interface 101 may display money flow 107 using text, numbers, and/or graphical representations.

Embodiments may additionally estimate further incoming and outgoing funds. Fund estimation may be based at least in part on historic and/or current transaction history, including withdrawal and/or deposit data such as resulting from payment requests 104.

Fund estimation may be based on regular and/or irregular transactions. Regular transactions may include regular periodic withdrawals and/or deposits for substantially the same amount, for example, a monthly rent payment or a biweekly salary deposit. Irregular transactions may include aperiodic and/or singular transactions, such as occasional payments to restaurants or occasional payments for task work, such as babysitting. Regular transactions and/or irregular transactions may each be associated with data about a transaction amount, a transaction timestamp, and/or contributing and/or involved parties, such as company identifiers. In some embodiments, deposits associated with a common sending party may be determined according to an identifier of the sender to be an income source.

Some embodiments may estimate aspects of incoming and/or outgoing transactions using one or more models, machine learning, pattern fitting, or other method known in the art. Estimated transactions may be associated with confidence estimations based on historic and/or current transactions. Incoming and/or outgoing fund estimations may be based on confidence estimations for transactions. For example, a singular payment may have a low level of confidence indicating it as an event expected to recur, whereas a monthly salary may have a high level of confidence. Accordingly, an embodiment may consider a future salary payment but not an unrelated singular payment in an estimation of incoming funds.

In some embodiments, transactions may be associated with transaction categories. Estimations may be based on money flow modeled or estimated for one or more transaction categories. For example, a "Salary" category may be used to estimate a monthly income of $5000 from Employer A, while a "Miscellaneous" category may be modeled off of irregular payments from Source P, Source Q, Source R, and Source S and used to estimate an income of $100 per month, without a specific associated source but based on the Miscellaneous categorization.

A user interface 101 may display estimated incoming funds in money flow 107 as predicted earnings 111. In some embodiments, an application may consider information from multiple income sources and display separate predicted earnings 111 with respect to different income sources or groups of income sources. A user interface 101 may display estimated outgoing funds as predicted spending 112.

Based on one or more of incoming funds, outgoing funds, estimated (e.g., predicted) incoming funds, and estimated (e.g., predicted) outgoing funds, embodiments may estimate a net flow of funds associated with a financial account. A user interface 101 may display an estimate of the net flow of funds as predicted net flow 113.

Some embodiments may adjust estimation of predicted incoming and outgoing funds based on adjustment of included transaction sources and/or destinations. For example, in user interface 101, options 114 may enable customization of sources included for these estimations, such as described in greater detail below with respect to FIGS. 1C-1I1. A predicted net flow of funds may be updated or recalculated according to customization of parties included in estimations.

A user interface 101 may display data relating to one or more transactions associated with an associated financial account. For example, recent transactions 115 may include one or more current and/or historic transactions, such as transaction 116. Transactions may be associated with timestamps, associated party identifiers such as sender and/or recipient name, transaction categories such as "Restaurants," transaction amounts, other data useful for identifying a transaction, or any combination thereof. Recent transactions 115 may display a set number of transactions 116, such as the twenty with the most recent timestamps, transactions within a specified time period, such as time frame 108, or transactions according to another organizational method. Categories of transaction 116 may be the same and/or different as categories used to estimate incoming and/or outgoing funds as discussed above.

FIG. 1B depicts an exemplary user interface 100B according to one or more embodiments described herein. FIG. 1B displays several of the same components as FIG. 1A. For the sake of brevity, such components will not be described again, but descriptions may be understood according to FIG. 1A's description above. However, embodiments are not limited in this context.

In the exemplary user interface 100A, the total of incoming funds (e.g., earnings 109) and estimated incoming funds (e.g., predicted earnings 111) is greater than the total of outgoing funds (e.g., spending 110) and estimated outgoing funds (e.g., predicted spending 112). However, in the exemplary user interface 100B, the total of outgoing funds (e.g., spending 110) and estimated outgoing funds (e.g., predicted spending 119) is greater than the total of incoming funds (e.g., earnings 109) and estimated incoming funds (e.g., predicted earnings 118). Specifically, as a result of lower estimated incoming funds, predicted earnings 118 is lower in interface 100B than predicted earnings 111. As a result of higher estimated outgoing funds, predicted earnings 118 is higher in interface 100B than predicted spending 112. As a result, the predicted net flow 120 is negative in the example shown in FIG. 1B.

Some embodiments may alert a user when an predicted net flow of funds is negative. For example, in response to predicted net flow 120 being negative, a user interface 101 may display an alert 121.

Additionally, or alternatively, embodiments may offer options to help a user cover a negative estimated fund flow. For example, options for a user to find additional income or find financial assistance may be respectively presented via buttons 122 and 123. Additional income may be added into calculations by incorporating pre-recognized income sources, such as via a user interface 100C as described with respect to FIG. 1C, and/or additional income sources may be suggested as in a user interface 100J as described with respect to FIG. 1J. In some embodiments, financial assistance may be suggested using products and/or services such as in a user interface 100I as described with respect to FIG. 1I.

Figure 1C:
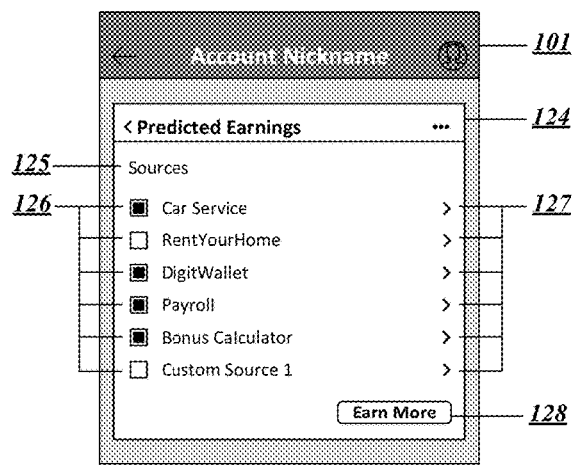

FIG. 1C depicts an exemplary user interface 100C according to one or more embodiments described herein. FIG. 1C displays several of the same components as FIGS. 1A-1B. For the sake of brevity, such components will not be described again, however elements of interfaces described above may be referenced and this figure may be understood according to FIGS. 1A-1B descriptions above. However, embodiments are not limited in this context.

In the exemplary interface 100C, a user interface 101 may receive a selection of one or more sources of income to inform estimations of incoming funds. For example, a selection of option 114 as described with respect to FIG. 1A and FIG. 1B and/or of button 122 as described with respect to FIG. 1B may direct a user interface 101 to aspects of interface 100C. Aspects of an interface 100C may be a pop-up menu, a drop-down menu or a separate page of an application, for example, found in application settings.

Embodiments may include at least one source of income for use in estimations of incoming funds. For example, predicted earnings detail page 124 may include one or more income sources 125 to be used in estimations. Sources may be preset, saved by a user, identified by identifier data associated with historic transactions, or otherwise recognized by embodiments. Sources may be saved in local or remote memory. One or more sources 125 may be managed by a third party. Some embodiments may integrate an application and/or user interface 101 with a third-party income source, such as via an application program interface (API). A user interface 101 may enable identification of additional income sources. At least one custom income source 125 may be specified by a user.

Some embodiments may determine estimations of incoming funds based on sources 125. Machine learning and/or at least one model may be used to determine the reliability of a source 125 and accordingly include or exclude the source 125 from incoming fund estimations. Additionally, or alternatively, a source 125 may be included or excluded from incoming fund estimations based on at least one indication received via a user interface 101. In some embodiments, machine learning and/or at least one model may be used to determine whether a source 125 should be included or excluded in estimations based on historic indications received associated with that source 125 or with at least one other source 125. For example, a machine learning algorithm may recognize the historic inclusion of a first source in estimations and accordingly include a second source in estimations based on the similarity between the first source and the second source. Embodiments are not limited in this context.

A user interface 101 may receive instructions or indications to include and/or exclude one or more of the sources 125 in estimations of incoming funds. For example, selection options 126 may be associated with sources 125. In exemplary interface 100C, available sources 125 include "Car Service," "RentYourHome," "DigitWallet," "Payroll," "Bonus Calculator," and "Custom Source 1." Based on selection options 126, an embodiment may include "Car Service," "DigitWallet," "Payroll," and "Bonus Calculator" in incoming fund estimations. Selection or deselection of a source 125 may override a preset or otherwise predetermined selection of a source 125 for inclusion or exclusion from income fund estimations. Estimations of incoming funds may be updated or recalculated based on selection or deselection of at least one income source. In some cases, estimates may be updated or recalculated in real time or near real time according to selections or deselections of sources. Some embodiments may update or recalculate estimates based on a trigger, such as an exit of a menu as illustrated in interface 100C.

A user interface 101 may present information related to a source 125 or necessary for use of a source 125 in incoming fund estimations in association with the source 125. For example, selection of an option 127 may prompt display of details associated with the source 125, such as historic and/or transaction information. For example, a user interface may display an estimated incoming fund amount in association with an estimated time of the incoming fund. In another example, selection of an option 127 may redirect a user to an application and/or website associated with an income source 125.

In some embodiments, one or more income sources may require permission settings and/or user credentials to be used in fund estimations. For example, user login information for a payroll service may be required for a system to interface with the payroll service via an API and thereby retrieve payroll payment information for transaction recognition. Embodiments may, in some cases, receive permission setting instructions and/or other information such as login credentials through an in-application interface, such as that depicted in FIG. 1D.

Many embodiments may determine potential additional income sources (e.g., to include in predicted earnings, or the like) based on one or more of incoming funds, outgoing funds, estimated incoming funds, or estimated outgoing funds, as described in greater detail below. A user interface 101 may receive a prompt to display information related to one or more potential income sources, such as via button 128. For example, embodiments may receive an indication of a selection of button 122 and accordingly present a user interface 100J as described in greater detail below.

Figure 1D:
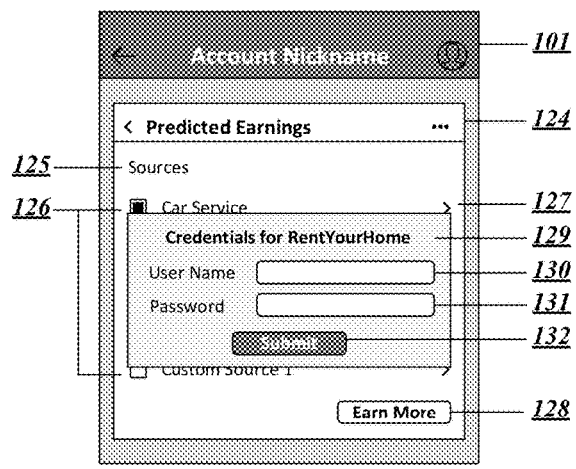

FIG. 1D depicts an exemplary user interface 100D according to one or more embodiments described herein. FIG. 1D displays several of the same components as FIGS. 1A-1C. For the sake of brevity, such components will not be described again, but descriptions may be understood according to FIGS. 1A-1C's descriptions above. However, embodiments are not limited in this context.

Interface 100D is part of an exemplary embodiment configured to receive information relating to an income source 125. Sources 125 may require information to log into and/or otherwise connect a user account to a third-party account or service. Embodiments may connect to third-party accounts, services, or other platforms via APIs, internet protocols, or other network protocols.

Some embodiments may be prompted to receive information relating to an income source 125 based on selection of that source 125 for inclusion in an estimation of incoming funds. Additionally, or alternatively, expiration of information and/or a received indication from the third-party account or service may prompt embodiments to receive new or updated information.

For example, selection of income source "RentYourHome," as illustrated in FIG. 1C, may prompt a user interface 101 to receive user credentials for RentYourHome. Accordingly, an interface 100D may present a window 129. A window 129 may be a pop-up window, a separate page of an application, a web page to which the application redirects, or other entry point suitable for receiving user credentials. Embodiments are not limited in this context.

A user interface 101 may accordingly receive input of a username and password for RentYourHome via fields 130 and 131, respectively. A user interface 101 may receive an indication that entry of information is complete, such as via a submit button 132, and accordingly save the entered information and/or submit the entered information to the third-party application or service.

Based upon successful entry, submission, and receipt of approval of user credentials for a third-party system, embodiments may process the third-party system as a new source 125. Income information from the source 125 may be retrieved from the third-party system as transactions to be integrated into existing transaction records, such as those displayed in recent transactions 115 of FIG. 1A, or the data may be processed and/or kept independently. Embodiments may retrieve current, recent, and/or historic data.

Figure 1E:
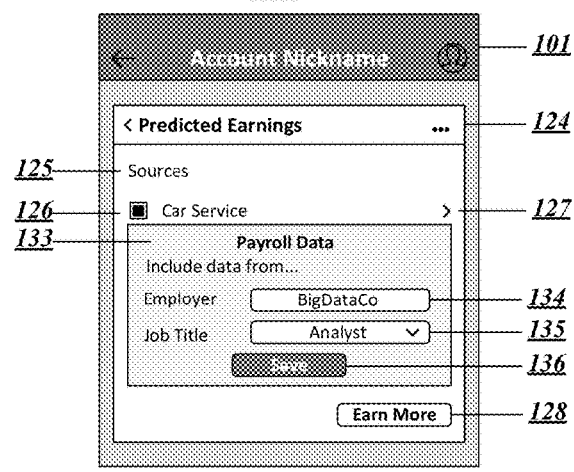

FIG. 1E depicts a further exemplary user interface 100E according to one or more embodiments described herein. FIG. 1E displays several of the same components as FIGS. 1A-1D. For the sake of brevity, such components will not be described again, but descriptions may be understood according to FIGS. 1A-1D's descriptions above. However, embodiments are not limited in this context.

Interface 100E may receive new information and/or updated information about a source 125 via window 133. A window 133 may be a pop-up window, a separate page of an application, a web page to which the application redirects, or other entry point suitable for receiving information about a source 125. Embodiments are not limited in this context.

A user interface 101 may present a window 133 to receive new or updated data about a source 125. For example, a source 125 may be a source already saved with associated data, a newly added source 125, a custom source 125, or a combination thereof.

A user interface 101 may receive an identifier of an income source, such as an employer number or an employer name, via an employer field 134. An employer identifier may be selected from a set of identifiers for employers associated with platforms set up and/or approved to interface with an application. Alternatively, or additionally, an employer identifier not previously associated with the application may be entered via an input device such as a keyboard.

A user interface 101 may receive additional information related to an income source. In some embodiments, additional information may also be, or alternatively be, related to the user of the user account. For example, a user interface 101 may receive an indication of a user's role and/or job title with respect to an employer identified with an income source. In interface 100E, a user interface 101 may receive an indication of a job title for a user employed by BigDataCo in the job field 135. A role or job title may be selected from a set of roles or job titles associated with an employer, such as via a drop-down menu, or be otherwise entered into window 133.

In some embodiments, information received via a user interface 101 may be used to access additional information related to a user and/or income source 125. For example, receipt of an employer and job title may allow a system to access salary information associated with the role of the job title with the employer. The salary information may then be used to identify transaction records as salary payments, as an example.

Additionally, or alternatively, identification of transaction records and/or estimation of data flow components may be based on other information received via a user interface 101. While interface 100E illustrates employer field 134 and job field 135, it will be understood that further or different information may be received through a window 133. For example, a salary amount, a monthly pay date, time employed, a job department, or other information may be received.

A system may save information associated with a source 125 via a save button 136. Based on saving the information, a system may update or recalculate processing of transaction data. For example, estimates of incoming funds may be recalculated or incoming funds may be reclassified with a transaction category specifying an income source 125.

Figure 1F:
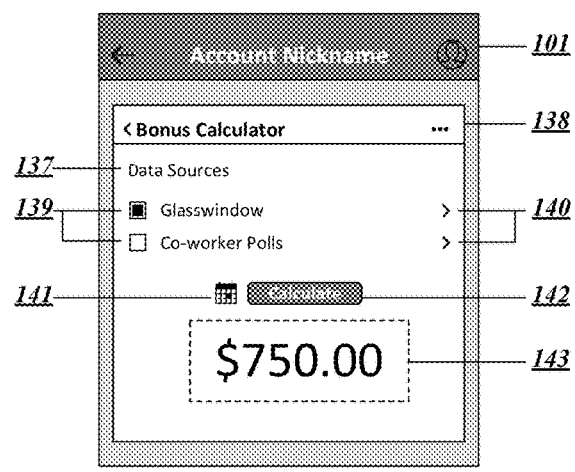

FIG. 1F depicts a further exemplary user interface 100F according to one or more embodiments described herein. FIG. 1F displays several of the same components as FIGS. 1A-1E. For the sake of brevity, such components will not be described again, but descriptions may be understood according to FIGS. 1A-1E's descriptions above. However, embodiments are not limited in this context.

In some embodiments, at least one income source may include a bonus, such as an end-of-year bonus. Employees may receive bonuses of pre-known amounts or bonuses that are determined by at least one of an employer, a role, time employed by the employer, department, co-worker reviews, performance metrics, or other variable terms. If a bonus amount is predictable, data about the expected payment may be received via a user interface 101 and saved. For example, bonus data may include the providing employer, an amount of the estimated bonus, and an estimated timestamp of receipt of the bonus.

Alternatively, or additionally, embodiments may include a bonus calculator. A bonus calculator may estimate at least one bonus amount for a user based on one or more data sources 137. Data sources 137 may include information related to the user's employment. For example, a bonus calculator may base estimations on employer information associated with the customer. Some embodiments may include information associated with sources 125 in employer information, such as an employer identifier. Some embodiments may receive and/or retrieve further information about a user's employment for bonus calculations.

Data sources 137 may additionally, or alternatively, include data managed by employers or third-party systems. For example, the source "Glasswindow" may be a website including information about one or more companies, including reports from employees about salary and bonuses associated with job titles, time worked at the company, and co-worker review data. Data sources 137, like sources 125, may include publicly accessible information and/or information only accessible with the use of user credentials or other permission satisfactions.

A bonus calculator may base estimations of a bonus amount based on input about the user from at least one co-worker of the user. For example, the bonus calculator may access a co-worker poll as a data source 137. A co-worker poll may include feedback about the user that have been facilitated by the entity of the user application, the employer of an employee, a third-party system, or a combination thereof. Positive reviews of a user by the user's co-workers may contribute to a higher estimated bonus, for example, or negative reviews may contribute to a lower estimated bonus.

A user interface 101 may receive instructions to include and/or exclude one or more data sources 137 in bonus calculations. For example, selection options 139 may be used in at least the same ways as selection options 126. In exemplary interface 100F, the illustrated selection of "Glasswindow" and the deselection of "Co-worker Polls" may direct calculation of an estimated bonus to include data from Glasswindow but not co-worker polls, for example.

A user interface 101 may receive information related to one or more data sources 137. For example, a bonus calculator interface 138 of a user interface 101 may include fields such as employer field 134 and job field 135 to receive information about a user's employment (not shown). In a further example, a bonus calculator interface 138 may receive information useful for accessing data sources 137 in at least analogous ways to a predicted earnings detail page 124. Fields for receiving and/or displaying information relating to a data source 137 may be displayed in response to receiving a selection indication of an option 140 corresponding to a data source 137.

An estimation may be calculated for a particular time frame. For example, a calendar entry 141 may be used to receive an indication of a range of time which an estimation should include, or for which an estimation should account for. In some embodiments, a time frame may be preset or established as a default.

Embodiments may calculate a bonus based on an indication that information for a calculation has been entered. For example, a user interface 101 may receive an indication via a calculate button 142. Calculation of a bonus may automatically update an estimation of incoming funds.

In some embodiments, a preview of an estimated amount may be shown via a user interface 101, such as in preview 143. A preview 143 may be shown based on a calculation performed as described above.

Figure 1G:
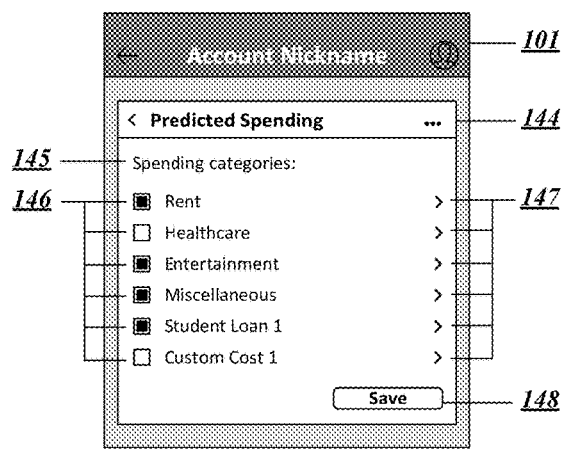

FIG. 1G depicts a further exemplary user interface 100G according to one or more embodiments described herein. FIG. 1G displays one or more of the same components as FIGS. 1A-1F. For the sake of brevity, such components will not be described again, but descriptions may be understood according to FIGS. 1A-1F's descriptions above. However, embodiments are not limited in this context.

In addition to, or alternatively to, estimations of incoming funds, embodiments may generate estimations of outgoing funds. In the exemplary interface 100G, a user interface may receive a selection of one or more categories or entities associated with outgoing costs to inform estimations of outgoing funds. For example, a selection of option 114 as described with respect to FIG. 1A may direct a user interface 101 to aspects of interface 100G. Aspects of an interface 100G may be a pop-up menu, a drop-down menu or a separate page of an application, for example, found in application settings.

Embodiments may include at least one spending category for use in estimations of incoming funds. For example, predicted spending detail page 144 may include one or more spending categories 145 to be used in estimations. Spending categories 145 may be preset, saved by a user, identified by identifier data associated with historic transactions, or otherwise recognized. Spending categories 145 may be saved in local or remote memory. One or more spending categories 145 may be managed by or otherwise associated with a third party. Some embodiments may integrate an application and/or user interface 101 with a third-party spending category 145, such as via an API. For example, an application may access bill data associated with a student loan through a third-party loan provider by using an API. A user interface 101 may enable identification of additional spending categories 145. At least one custom spending category 145 may be specified by a user.

Some embodiments may determine estimations of outgoing funds based on spending categories 145. Machine learning and/or at least one model may be used to determine the reliability of a spending category 145 and accordingly include or exclude the spending category 145 from outgoing fund estimations. Additionally, or alternatively, a spending category 145 may be included or excluded from outgoing fund estimations based on at least one indication received via a user interface 101. In some embodiments, machine learning, pattern fitting, and/or at least one model may be used to determine whether a spending category 145 should be included or excluded in estimations based on historic indications received associated with that spending category 145 or with at least one other spending category 145. For example, a machine learning algorithm may recognize the historic inclusion of a first spending category in estimations and accordingly include a second spending category in estimations based on the similarity between the first spending category and the second spending category. Embodiments are not limited in this context.

A user interface 101 may receive instructions or indications to include and/or exclude one or more of the spending categories 145 in estimations of outgoing funds. For example, selection options 146 may be associated with spending categories 145. In exemplary interface 100G, available spending categories include "Rent," "Healthcare," "Entertainment," "Miscellaneous," "Student Loan 1," and "Custom Cost 1." Based on selection options 146, an embodiment may include "Rent," "Entertainment," "Miscellaneous," and "Student Loan 1" in outgoing fund estimations. Selection or deselection of a spending category 145 may override a preset or otherwise predetermined selection of a spending category 145 for inclusion or exclusion from outgoing fund estimations. Estimations of outgoing funds may be updated or recalculated based on selection or deselection of at least one spending category. In some cases, estimates may be updated or recalculated in real time or near real time according to selections or deselections of spending categories. Some embodiments may update or recalculate estimates based on a trigger, such as an exit of a menu as illustrated in interface 100G.

A user interface 101 may present information related to a spending category 145 in outgoing fund estimations in association with the spending category 145. For example, selection of an option 147 may prompt display of details associated with the spending category 145, such as historic and/or transaction information. For example, a user interface may display an estimated outgoing fund amount in association with an estimated time of the outgoing fund. In another example, selection of an option 147 may redirect a user to an application and/or website associated with a spending category 145.

In some embodiments, one or more spending categories may require permission settings and/or user credentials to be used in fund estimations. For example, user login information for a healthcare provider may be required for a system to interface with the healthcare provider via an API and thereby retrieve bill information for transaction recognition. Embodiments may, in some cases, receive permission setting instructions and/or other information such as login credentials through an in-application interface, such as that depicted in user interface 100D.

A system may save information associated with at least one spending category 145 via a save button 148. Based on saving the information, a system may update or recalculate processing of transaction data. For example, estimates of outgoing funds may be recalculated or outgoing funds may be reclassified with a transaction category specifying a spending category 145.

Figure 1H:
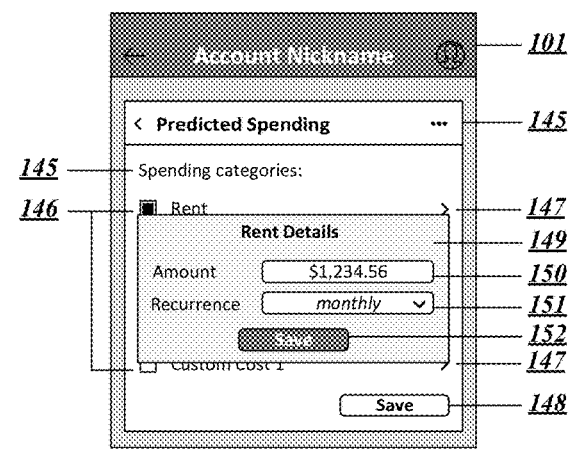

FIG. 1H depicts an exemplary user interface 100H according to one or more embodiments described herein. FIG. 1H displays several of the same components as FIGS. 1A-1G. For the sake of brevity, such components will not be described again, but descriptions may be understood according to FIGS. 1A-1G's descriptions above. However, embodiments are not limited in this context.

Interface 100H is part of an exemplary embodiment configured to receive information relating to a spending category 145.

Some embodiments may be prompted to receive information relating to a spending category 145 based on selection of that category 145 for inclusion in an estimation of predicted spending. Additionally, or alternatively, expiration of information and/or a received indication from the third-party account or service may prompt embodiments to receive new or updated information.

For example, selection of spending category "Rent," as illustrated in user interface 100G, may prompt a user interface 101 to receive details about a user's rent payments. Accordingly, an interface 100H may present a window 149. A window 149 may be a pop-up window, a separate page of an application, a web page to which the application redirects, or other entry point suitable for receiving information relating to outgoing funds. Embodiments are not limited in this context.

A user interface 101 may accordingly receive input of an amount and recurrence period for Rent via fields 150 and 151, respectively. Fields may receive information via an input device such as a keyboard, via selection from a set of options presented in a dropdown menu, or other input as known in the art. A user interface 101 may receive an indication that entry of information is complete, such as via a save button 152, and accordingly save the entered information and/or submit the entered information to a third-party application or service.

Spending categories 145 may require information to log into and/or otherwise connect a user account to a third-party account or service. Embodiments may connect to third-party accounts, services, or other platforms via APIs, internet protocols, or other network protocols. In these embodiments, a window 149 may receive user credentials such as described with respect to window 149 of user interface 100H. Embodiments are not limited in this context.

Based upon successful entry, submission, and receipt of approval of user credentials for a third-party system, embodiments may process the third-party system as a new spending category 145. Income information from the spending category 145 may be retrieved from the third-party system as transactions to be integrated into existing transaction records, such as those displayed in recent transactions 115 of user interface 100A, or the data may be processed and/or kept independently. Embodiments may retrieve current, recent, and/or historic data.

Figure 1I:
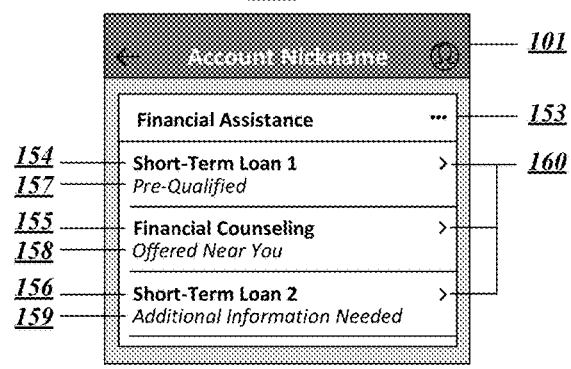

FIG. 1I depicts an exemplary user interface 100I according to one or more embodiments described herein. FIG. 1I displays one or more of the same components as FIGS. 1A-1H. For the sake of brevity, such components will not be described again, but descriptions may be understood according to FIGS. 1A-1H's descriptions above. However, embodiments are not limited in this context.

Various embodiments may determine one or more recommendations based on estimated incoming and/or outgoing funds. For example, embodiments may recommend one or more products or services offered by a business to a customer. Embodiments may determine a user's eligibility and/or likelihood to use at least one product and recommend one or more products accordingly. Eligibility may be based on financial history, such as determined using historic transaction data, a credit score, an association with at least one other user otherwise eligible, association with the business such as a subscription to service, other products or services used by the customer, other information useful for determining financial security, or any combination thereof. A user's likelihood of using a product and/or service may be determined based on at least one of a historic engagement of the user with a product and/or service, a historic engagement of users associated with the user with a product and/or service, a historic engagement of users in a geographic region associated with the user with a product and/or service, or a historic engagement of users similar to the user with a product and/or service.

Interface 100I is part of an exemplary embodiment enabled to present information relating to one or more recommendations.

A user interface 101 may display at least one recommendation relating to financial assistance available to and/or recommended for a user. For example, financial assistance detail page 153 may include one or more recommendations 154, 155, and/or 156. Recommendations may relate to products and/or services offered by an enterprise. In some embodiments, recommendations may be presented based on a determination of availability, user eligibility, and/or user likelihood to engage with a product and/or service. In many embodiments, recommendations may be presented based on a determination that the product and/or service offered may be useful in promoting financial well-being for the user. In various embodiments, a user interface 101 display additional information relating to a recommendation, such as preview information 157, 158, and 159. Preview information may display at least one reason for the presentation of the recommendation and/or a required action relating to the recommendation.

For example, recommendation 154 may relate to a short-term loan 1 for which the user has been determined to qualify based on credit history, predicted earnings, or the like. For example, short-term loan 1 can be pre-qualified based on verified future income (e.g., via earnings credentials received via window 129, or the like). The short-term loan 1 may be for an amount of funds determined to be sufficient to increase a predicted net flow 120 of funds to be a positive value. Preview information 157 may be displayed to indicate the user's pre-qualification for the loan. As a further example, recommendation 155 may relate to a financial counseling service determined based on geographical data to be offered at a location within a range of a location associated with the user. Preview information 158 may communicate the geographic proximity as a reason for the recommendation's presentation. In yet a further example, a recommendation 156 may relate to a second short-term loan. As indicated by preview information 159, further information may be required relating to the user prior to approval of the loan for the user. Further details may be presented and/or information collected via a user interface 101 relating to a recommendation, for example, via an option 160.

Figure 1J:

FIG. 1J depicts an exemplary user interface 100J according to one or more embodiments described herein. FIG. 1J displays one or more of the same components as FIGS. 1A-1I. For the sake of brevity, such components will not be described again, but descriptions may be understood according to FIGS. 1A-1F s descriptions above. However, embodiments are not limited in this context.

Various embodiments may determine one or more additional income sources based on incoming and/or outgoing funds. Additional income sources may be determined based on a user eligibility and/or likelihood to participate in the source.

Eligibility may be based on data about the user relating to historic employment and/or qualifications. Data relating to historic employment and/or qualifications of a user may be based on input received from a user and/or information collected in a source. Information relating to a user's eligibility may be received via a user interface. For example, a user interface 101 may receive information relating to a user's employment history based on questions presented to the user. Some embodiments may collect information to support eligibility determinations from third-party sources according to permissions enabled by the user. For example, a determination of a user's eligibility may be determined based on a resume for a user from a job recruitment service according to access enabled by the user.

A likelihood that a user may engage in an additional income source may be determined based on at least one of the user's past engagement with an income source, an engagement of a related user with an income source, an engagement of a similar user with an income source, a geographic distance of the income source from the user, a time requirement associated with the income source, a user preference setting, or other consideration relevant to an employment decision. A user may or may not have previous association with a presented additional income source.

In various embodiments, an additional income source may be presented based on an associated estimated income amount for the income source. For example, the additional income source may be presented based on a determination that an associated income amount would increase a net flow 120 to be positive. Associated income estimations may be based on data relating to the income source and/or data relating to the user's potential engagement with the income source. For example, data relating to the income source may include an hourly pay rate and/or a task-based pay rate for a position, while data relating to the user's potential engagement with the income source may include an eligibility for a certain position, an number of hours the user is available per week, and/or a skill set of the user. In many cases, income sources may be presented via a user interface 101 based on a determination that the income source includes an open position relevant to the user. For example, income sources without any open positions may not be recommended. A determination of whether an income source has an open position may be based on an internal database and/or a remote database, which may be managed by the entity associated with the system and/or a third-party entity. For example, a determination of whether an income source has an open position may be based on whether the income source as associated job postings in a recruitment service.

Interface 100J is part of an exemplary embodiment enabled to present information relating to one or more additional income sources.

A user interface 101 may present a user with one or more recommendations for supplementary income sources, such as via additional income sources detail page 161. Various embodiments may display information relating to an income source, a position associated with the income source, a commitment expectation relating to the income source, and/or other information relating to the income source. A user interface 101 may display information to provide context for a recommendation of an income source.

For example, recommendation 162 may be presented via a user interface 101, relating to a position as a driver for a car service. The recommendation 162 may be presented with associated preview information 163, which specifies an expected commitment of five rides given per week. The expected commitment may be associated with a standard rule set by the income source entity, an availability of the user, and/or an associated expected income. In some embodiments, the expected commitment may be based on an associated expected income to be sufficient to increase an amount of predicted earnings 118. In another example, a recommendation 164 may be presented for a position of a host with an income source RentYourHome. The recommendation 164 may be presented with preview information 165 specifying an expected commitment of three days per month. In yet another example, a recommendation 166 may be displayed for an additional income source AnotherJob, which may have an expected commitment of ten hours per week, as shown by preview information 167.

Further information relating to an additional income source may be presented and/or linked to a recommendation. For example, selection of an option 168 associated with a recommendation may access further information about an income source and/or role therewith, contact information for the income source, a link to a website for the income source, and/or other data. In several embodiments, further information sufficient to enable a customer to take advantage of an additional income source may be provided.

Figure 2:
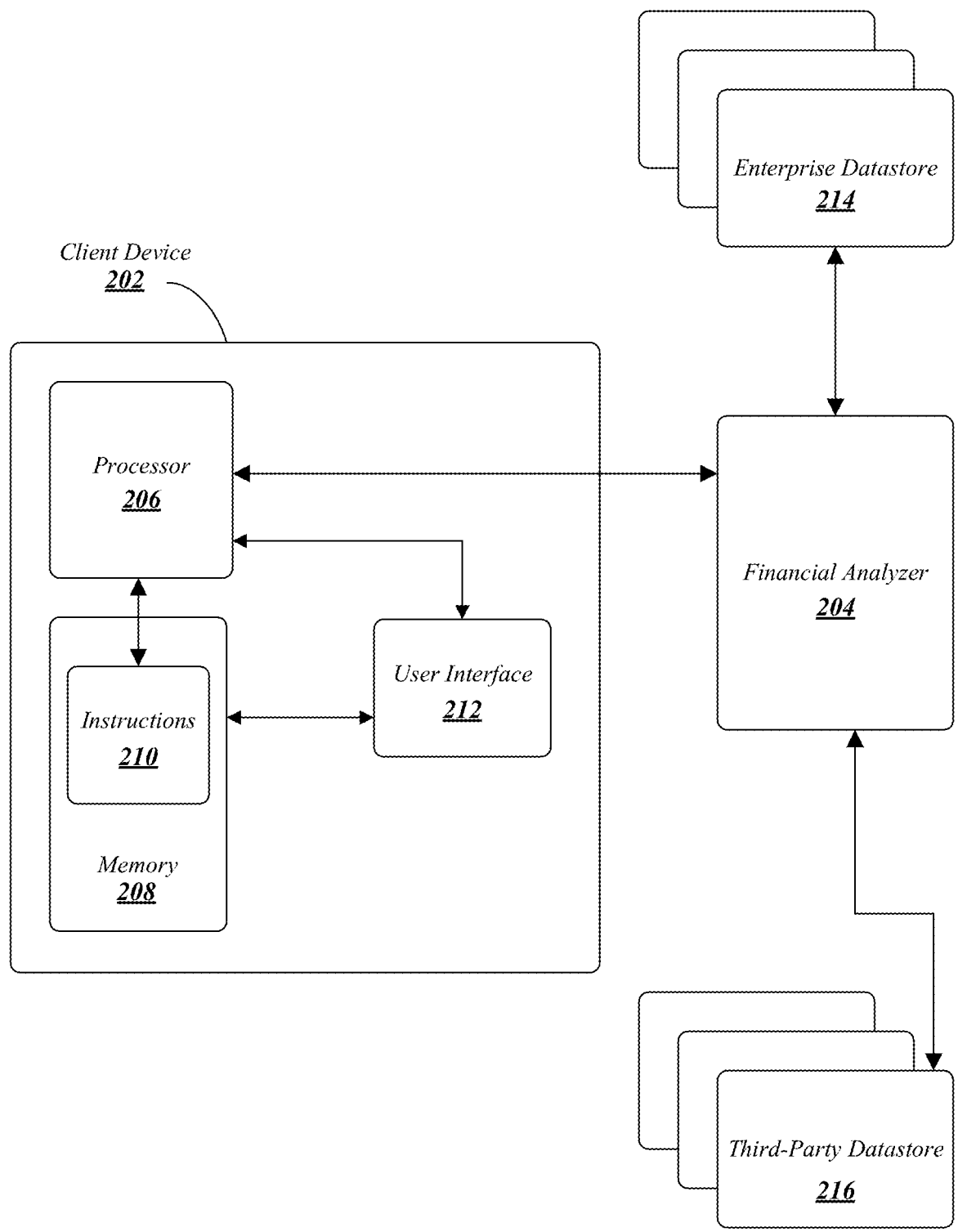
FIG. 2 is a block diagram depicting exemplary information exchange in a client/server environment according to one or more embodiments described herein.

FIG. 2 is a block diagram depicting information flow according to one or more embodiments described herein. Individual components may be implemented on separate devices, any group of components may be implemented on the same device, and/or any component may be implemented across a plurality of devices. Embodiments are not limited in this context.

A client device may be communicatively coupled to a financial analyzer 204. A client device may be, for example, a mobile device, a laptop, a desktop computer, or other device. The client device 202 may include a processor 206 and/or a memory 208. The memory 208 may include one or more transitory and/or non-transitory datastores. In some embodiments, a memory 208 may store data related to user data and/or user preferences.

In various embodiments, a memory 208 may include instructions 210. Instructions 210 may be configured to be executed by the processor 206 to enable one or more methods described herein.

A client device 202 may include a user interface 212. The user interface 212 may be configured to present data based on the operations of the processor 206, according to one or more embodiments described herein. For example, a user interface 212 include a user interface 101. More specifically, processor 206 in executing instructions 210 may generate user interface 212 and cause user interface 212 to be presented on a display (not shown).

A user interface 212 may be configured to receive input, for example, via a touchscreen, keyboard, number pad, mouse, or other device. Based on input received via a user interface 212, information may be saved to a memory 208. For example, user preference data and/or data selection received via a user interface 212 may be stored in a memory 208.

In some embodiments, a financial analyzer 204 may be in part or in whole implemented on a client device 202. For example, a financial analyzer 204 may be implemented via instructions 210. In other embodiments, a financial analyzer 204 may be located remotely from a client device. For example, a financial analyzer 204 may be on a server accessible by at least one client device 202. In many embodiments, a financial analyzer 204 may establish an authenticated communication channel with one or more aspects of a client device 202, for example, a user interface 212.

A financial analyzer 204 may be configured to calculate amounts of funds earned and/or spent, such as earned funds 109 and/or spent funds 110, as well as to estimate incoming and/or outgoing funds, such as predicted earnings 118, predicted spending 119, and predicted net flow 120.

A financial analyzer 204 may be communicatively coupled with at least one enterprise datastore 214. An enterprise datastore 214 may contain information relating to one or more user, product, and/or service associated with an enterprise. For example, an enterprise datastore 214 may include data relating to an account balance, historic transactions of a user, or a user setting associated with an account. In another example, an enterprise datastore 214 may include data relating to account balances, historic transactions, or user settings of multiple users, such as a set of users associated with an enterprise.

An enterprise datastore 214 may include data associating one or more product and/or service with a user. For example, an enterprise datastore 214 may include a list of products that a particular user is eligible for, or an enterprise datastore 214 may include records of requirements for product or service eligibility which a user has met. In yet another example, an enterprise datastore 214 may include records relating to a user's historic employment, as enabled by a user setting or otherwise provided by the user. At least some data in an enterprise datastore 214 may, in some embodiments, be retrieved from a third-party datastore, such as third-party datastore 216.

At least one third-party datastore 216 may be communicatively coupled to a financial analyzer 204. A third-party datastore 216 may include information managed by a third-party entity and not otherwise available to an enterprise. For example, a third-party datastore 216 may include income data or employment data for one or more users associated with the enterprise, one or more job postings, and/or data relating to at least one product or service offered by a third-party. For example, a third-party datastore 216 may be associated with an income source.

In some embodiments, aspects of an enterprise datastore 214 and/or a third-party datastore 216 may be accessed only after authentication of a user and/or enablement of a privacy setting. For example, a financial analyzer may access a third-party datastore 216 based on credentials received by a user interface 212 on a client device 202, such as via fields 130 and 131. In many embodiments, a financial analyzer may establish an authenticated communication channel with an interface associated with an enterprise, an income source, or another third party based on received and/or stored credentials. A financial analyzer 204 may exchange information with an enterprise datastore 214 and/or a third-party datastore 216 via an interface such as an application programming interface (API), a web program, or other platform.

In many embodiments, a financial analyzer 204 may process data from at least one enterprise datastore 214 and/or third-party datastore 216 in order to generate one or more estimations of income flow for a user. For example, a financial analyzer 204 may calculate earned funds 109, spent funds 110, predicted earnings 111, predicted spending 112, and/or predicted net flow 113 based on data from an enterprise datastore 214 and/or a third-party datastore 216. A financial analyzer 204 may generate at least one estimation and/or recommendation based on data from an enterprise datastore 214 and/or a third-party datastore 216, such as recommendation 154, 155, 156, 162, 164, and/or 166. In one or more embodiments, a financial estimation and/or recommendation may be stored to memory associated with the financial analyzer 204, the client device 202, an enterprise datastore 214, and/or a third-party datastore 216.

Figure 3A:
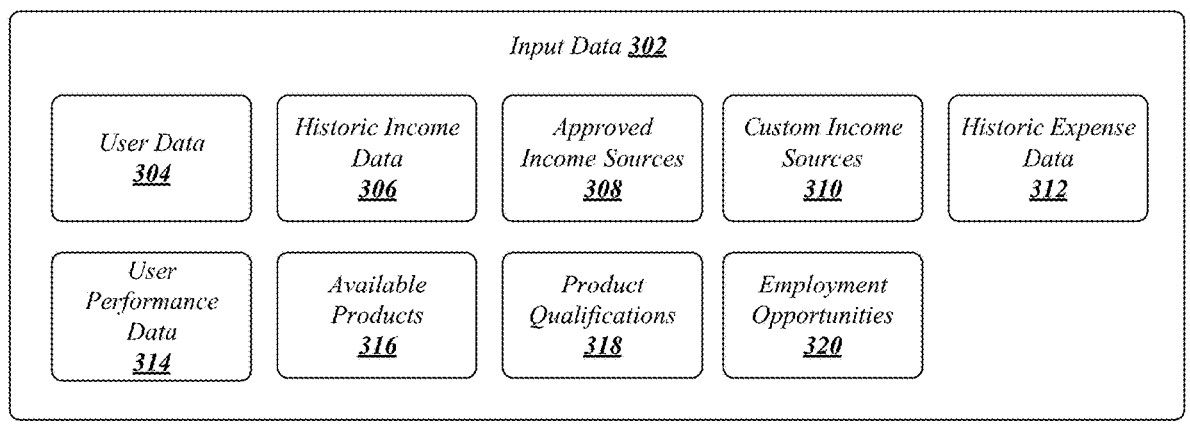
FIGS. 3A-B is a block diagram depicting exemplary information exchange in a financial analyzer
Figure 3A:
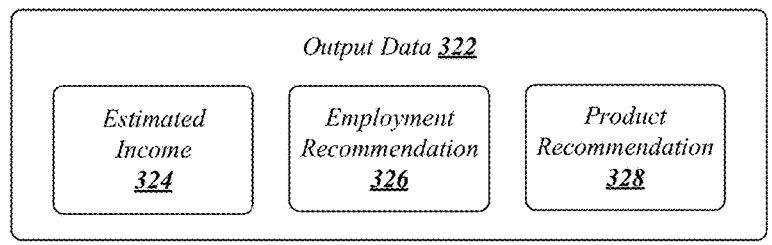

FIG. 3A is a block diagram depicting data structures according to one or more embodiments described herein. A financial analyzer 204, such as described with respect to FIG. 2, may receive input data 302 and/or generate output data 322. Embodiments are not limited in this context.

Input data 302 may comprise at least one message, link, table, data cell, indicator, row, and/or other data structure containing information useful for a financial analyzer to operate as described herein. Input data 302 may comprise one or more of user data 304, historic income data 306, approved income sources 308, custom income sources 310, historic expense data 312, user performance data 314, available products 316, product qualifications 318, or employment opportunities 320. Input data 302 may include data of the same or various types. A financial analyzer 204 may receive input data 302 in a single package or multiple packages. For example, a financial analyzer 204 may receive separate input data 302 based on the type of data included, based on the source of the data included in the input data 302, and/or based on the component of the financial analyzer 204 receiving the input data 302. Input data 302 may comprise information received from local storage, at least one enterprise database 214, at least one third-party datastore 216, and/or a combination thereof. For example, input data 302 may comprise all or some of user data 304 from a database of user data 304. In many embodiments, user preference settings and/or user selections may be used to determine which datastore or datastores input data 302 is received from. In some embodiments, a financial analyzer 204 may receive input data 302 based on a query of a database, for example, a database of user data 304, historic income data 306, approved income sources 308, custom income sources 310, historic expense data 312, user performance data 314, available products 316, product qualifications 318, or employment opportunities 320. Input data 302 may be received via an interface such as an API, web program, or other platform.

User data 304 may include data associated with at least one user of a financial analyzer 204. User data 304 may comprise data relating to preference, access and/or security settings, account information for a user, account balance information for a user, saved credentials to access information from an enterprise datastore 214 and/or a third-party datastore 216, credit history data for a user, employment history data for a user, records of products or services a user has historically interacted with, or other data useful for generating a financial estimation 358 specific to an account for a user. In some embodiments, user data 304 may include comparisons of one or more users to each other. For example, user data 304 may include a measure of similarity between users, indications of groups of similar users, or other metric of comparison of users. Similarity may be based on historic and/or present financial wellbeing, credit history, engagement with products and/or services, and/or other behavioral pattern.

Historic income data 306 may include one or more records relating to the flow of funds into of an account for at least one user. For example, historic income data 306 may comprise a database of ledger records for users associated with an enterprise. Each record may be associated with a user by a user identifier. In many embodiments, user data 304 may comprise data corresponding to a user associated with a record of historic income data 306. For example, user data 304 and historic income data 306 may comprise data associated with the same user account. Likewise, approved income sources 308 and/or custom income sources 310 may comprise data associated with the same user account as data in user data 304.

In many embodiments, records of historic income data 306 may be associated with transaction information. Transaction information may comprise a fund amount, a timestamp, an identifier of at least one party involved in the transaction, and/or an account balance at the time of the transaction. In some embodiments, records relating to transactions for a user between the user and a common party may be grouped or associated with each other. For example, historic income data 306 may comprise transactions representing payments from a particular income source, recognized by an identifier of the income source in transaction data across multiple transactions.

Approved income sources 308 may comprise information relating to one or more streams of incoming funds. Approved income sources 308 may include information relating to a job and/or position presently and/or historically held by at least one user of a financial analyzer 204. In some embodiments, approved income sources 308 may pertain to jobs historically held by a single user.

Approved income sources 308 may include information such as an identifier for the source of incoming funds, an amount of funds historically received and/or estimated to be received, a timestamp for at least one historic and/or estimated reception of funds, a metric of the reliability and/or confidence of an estimation of continued income from the source, a location of the income source, a schedule of a user's employment with the income source, and/or other information related to income sources 308. Income sources 308 may include information relevant to one or more income sources. Income sources may be associated with an entity of the financial analyzer, a third-party entity, or a combination thereof. In some embodiments, at least one income source of approved income sources 308 may be associated with a product offered by an enterprise, such as a loan.

Approved income sources 308 may include a user's association with an income source, such as a job title, a verification of employment, or other data useful for associating the user with the income source. In various embodiments, an income source in approved income sources 308 may include an income priority indicator that the income sources is a primary, secondary, and/or supplementary income source for a user. An income priority indicator may be based on user input, a schedule for the income source, a comparison of the income source to other income sources the user is employed by, and/or another method of labeling the priority of the income source for the user. Income sources may contribute regularly or irregularly to a user's income.

In various embodiments, approved income sources 308 may include only income sources which have been verified by a user, a financial analyzer 204, and/or an entity associated with the financial analyzer 204. For example, an income source may only be included in approved income sources 308 after a user has provided credentials to verify association with the income source. In another example, approved income sources 308 may only include an income source after an authentication of income source as a legitimate employer by an entity associated with the financial analyzer. Approved income sources 308 may comprise data relating to one or more income source based on an association, agreement, and/or partnership of an entity associated with the financial analyzer with an entity associated with the one or more income sources. Data included in approved income sources 308 may be preloaded or known based on the approval and/or recognition of an income source.

Custom income sources 310 may include data related to at least one income source received from a user, such as via a user interface 212. Custom income sources 310 may include one or more components as described with respect to approved income sources 308. Data related to custom income sources 310 may be related to an income source included in approved income sources 308 and/or another income source. For example, data in custom income sources 310 may supplement or supersede data for an approved income source. In another example, data in custom income sources 310 may comprise a record for a new income source. Custom income sources 310 may be stored in association with a single user account or for multiple accounts.

Historic expense data 312 may include one or more records relating to the flow of funds out of an account for at least one user. For example, historic expense data 312 may comprise a database of ledger records for users associated with an enterprise. Each record may be associated with a user by a user identifier. In many embodiments, records of historic expense data 312 may be associated with transaction information. Transaction information may comprise a fund amount, a timestamp, an identifier of at least one party involved in the transaction, and/or an account balance at the time of the transaction.

User performance data 314 may include at least one record of a user's performance relative to an income source. For example, user performance data 3.14 may include at least one of a performance review, a measure of productivity in a job, a co-worker poll, or a measure of funds earned for an entity. In some embodiments, user performance data 314 may include a record of a user's historic employment with respect to an income source, for example, a duration of employment in a particular position. User performance data 314 may be based on an individual user or based on a comparison of metrics for a user to metrics to other employees of the entity of the income source.

Available products 316 may include one or more products and/or services. Available products 316 may be offered by an entity associated with the financial analyzer, by a third-party entity, or by a combination thereof. Examples of products may include a loan, a financial grant, an investment opportunity, a financial account, a credit card, or other financial product. Examples of services may include financial counseling, classes related to products, or other financial service.

Available products 316 may include qualification requirements. For example, requirements may include a credit score above a threshold, approval by an entity associated with the financial analyzer, completion of a class, prior use of another available product and/or service, or a combination thereof.

Product qualifications 318 may include one or more records relating to a user's qualifications for at least one product and/or service. In some embodiments, product qualifications 318 may be associated with a particular product and/or service. In some embodiments, product qualifications 318 may comprise a list, table, and/or datastore of generalized qualifications. For example, product qualifications 318 may include a user's financial history, credit history, current credit score, historic engagement with products and/or services, account balance, historic account history, recommendations by other entities, eligibility score, income data, or other data useful for determining product and/or service eligibility.

Employment opportunities 320 may comprise one or more available positions associated with income sources. In some embodiments, employment opportunities 320 may pertain to income sources which a user has historically engaged with and/or been employed by. Additionally, or alternatively, employment opportunities 320 may pertain to income sources which the user has not previously engaged with and/or been employed by. For example, a position in employment opportunities 320 may be associated with an income source of approved income sources 308 associated with a similar user.

Employment opportunities 320 may include data associated with at least one estimated potential income amount, requirements of a position, location of a position, schedule of a position, flexibility of a position, application data, a link to an application, application deadline data, contact information associated with the income source, a connection of a user to the position such as association of the user with an employee of the income source, a link to a website for an income source, a position description, and/or other information useful for a user interested in pursuing employment with a position of the employment opportunities 320. In some embodiments, employment opportunities 320 may include positions based on an estimated income amount for the position, a comparison of position requirements with user data 304 for a user, position and/or schedule comparison of a position to a user's information relative to user data 304 and/or other employment data, such as employment data from approved income sources 308 and/or custom income sources 310.

In various embodiments, a financial analyzer may update, generate, add to, or delete information relating to one or more of user data 304, historic income data 306, approved income sources 308, custom income sources 310, historic expense data 312, user performance data 314, available products 316, product qualifications 318, or employment opportunities 320. For example, a financial analyzer 204 may receive setting preferences for a user via a user interface 212. Accordingly, the financial analyzer 204 may update user data 304 with the setting preferences for the user. In another example, a financial analyzer 204 may receive an indication of and/or recognize a user interaction with a product. Accordingly, the financial analyzer 204 may update user data 304 with a record of the interaction. Embodiments are not limited in this context.

A financial analyzer 204 may generate output data 322. In many embodiments, a financial analyzer 204 may generate output data 322 based on input data 302. Output data 322 may comprise at least one message, link, table, data cell, indicator, row, and/or other data structure including one or more of an estimated income 324, employment recommendation 326, or product recommendation 328.

An estimated income 324 may include data relating to estimated funds in and/or out of an account. A financial analyzer 204 may generate an estimated income 324 based on records and/or estimates of incoming/outgoing funds, such as historic income data 306, approved income sources 308, custom income sources 310, historic expense data 312, and/or indications of user engagement with one or more available products 316 and/or employment opportunities 320. For example, output data 322 may be generated with estimated income 324 corresponding to earned funds 109, spent funds 110, predicted earnings 111, predicted spending 112, and/or predicted net flow 113.

An employment recommendation 326 may include one or more positions. A financial analyzer 204 may identify one or more positions from employment opportunities 320 based on user data 304 and/or income data such as included in estimated income 324. In some embodiments, an employment recommendation 326 may include for each included position an identifier of the position, a pay rate, a commitment required to earn sufficient funds via the position, contact information for the position, and/or access to an application for the position.

A product recommendation 328 may include an indication of one or more available products 316. A financial analyzer 204 may select one or more products and/or services from available products 316 for inclusion in a product recommendation 328 based on an estimated income 324, user data 304, available products 316, and/or product qualifications 318.

In various embodiments, output data 322 may include an employment recommendation 326 and/or a product recommendation 328 based on a determination by a financial analyzer 204 that a user's participation in a corresponding position, product, and/or service would be sufficient to increase an estimated income 324 beyond a threshold. In some embodiments, a financial analyzer 204 may include an employment recommendation 326 and/or a product recommendation 328 in output data 322 based on the engagement of similar users with a corresponding position, product, and/or service.

Figure 3B:
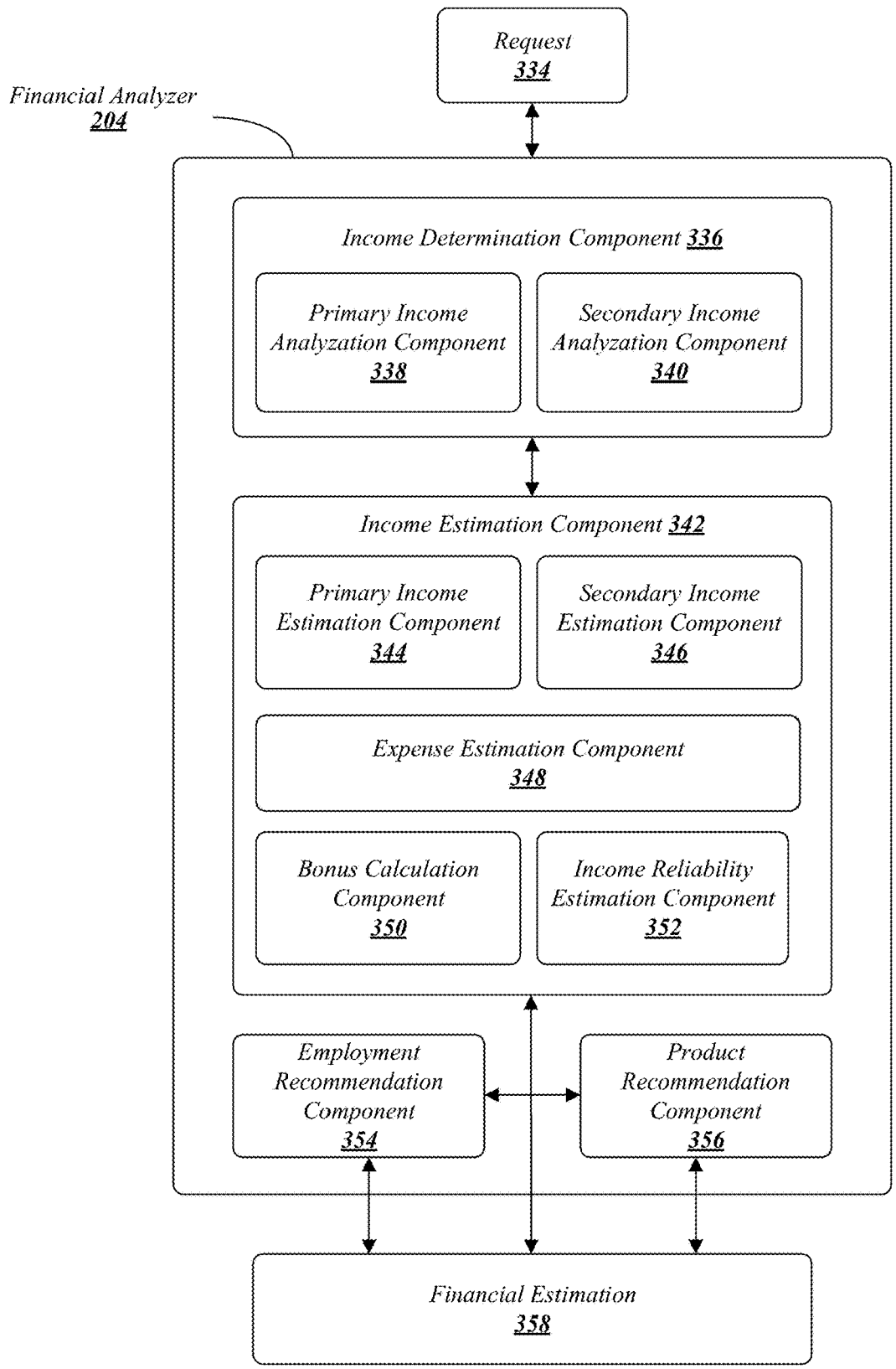

FIG. 3B is a block diagram depicting information flow according to one or more embodiments described herein. A financial analyzer 204, such as described with respect to FIG. 2, may receive a request 334. In some embodiments, a request 334 may comprise input data 302. In some embodiments, a request 334 may include information to authenticate a user, such as account credentials and/or login information. Based on the request 334, the financial analyzer 204 may generate a financial estimation 358. The financial analyzer 204 may access data from one or more communicatively coupled databases, such as at least one enterprise datastore 214 and/or at least one third-party datastore 216. In some embodiments, data from at least one communicatively coupled database may be received as input data 302 separate from a request 334. In many embodiments, settings, preferences, or selections associated with a user may be used to determine which database or databases input data 302 is received from. Individual components of a financial analyzer 204 may be implemented on separate devices, any group of components may be implemented on the same device, and/or any component may be implemented across a plurality of devices. Embodiments are not limited in this context.

A financial analyzer 204 may receive a request 334. A request 334 may be received from a device, such as client device 202. In some embodiments, a request 334 may be received via a user interface 212. In some embodiments, a processor 206 may generate a request 334 based on instructions 210. A request 334 may comprise a log in and/or a request to access to one or more aspects of functionality of a financial analyzer 204. For example, a request 334 may be a request based on an indication received by a user interface 212 to estimate, find, and/or present at least one additional income source or source of financial assistance available for a user, such as via buttons 122 and 123.

In some embodiments, a new or supplementary request 334 may be generated based on indications that parameters for a financial estimation have changed. For example, if information available to a financial analyzer 204 via an enterprise datastore 214 or a third-party datastore has been updated, a financial may receive an indication of the update as a request 334. In another example, a financial analyzer 204 may otherwise detect a change in an enterprise datastore 214 and/or a third-party datastore 216 and interpret the update as a request 334. In some embodiments, a request 334 may comprise a list or an update to a list of settings and/or sources to include in estimations. For example, a request 334 may comprise a list of one or more selection options 146 selected and/or deselected via a user interface 212, such as described with respect to user interface 100G. In a further example, a request 334 may include at least one setting for an income source and/or a spending category. For example, a request 334 may include settings for a recurring rent cost, such as those received via fields 150 and 151 in user interface 100H. In some embodiments, a request 334 may include additional user credentials to access data via one or more enterprise datastores 214 and/or third-party datastores 216. For example, a request 334 may include credentials received via fields 130 and 131, as described with respect to user interface 100D. In some embodiments, a financial analyzer 204 may interpret a request 334 containing credentials for a datastore as an indication that data from the datastore should be included in estimations and calculations of the financial analyzer 204. In other embodiments, the entry of credentials for a source and the selection of the source for inclusion in calculations may be separated.

A financial analyzer 204 may comprise an income determination component 336 and/or an income estimation component 342. Either an income determination component 336 or an income estimation component 342, or both the income determination component 336 and an income estimation component 342, may be used to generate a financial estimation 358. In many embodiments, a financial analyzer 204 may process at least one source of income and/or destination of spending to generate an estimated income 324 as part or all of a financial estimation 358. In many embodiments, financial analyzer 204 may generate the estimated income 324 using the income determination component 336 and/or the income estimation component 342.

In various embodiments, an income determination component 336 may determine income related to one or more income sources. For example, a primary income analyzation component 338 may determine income related to a primary income source and a secondary income analyzation component 340 may determine income related to a secondary income source. One or more income sources may be identified as primary, secondary, and/or supplementary income sources, and one or more income sources may be analyzed by each of a primary income analyzation component 338, a secondary income analyzation component 340, or other income analyzation component (not illustrated).

An income estimation component 342 may estimate income for a user. In many embodiments, income estimations may be for a determined time frame. For example, an income estimation may be for the rest of time in a month, for a 3-month period, or for a remainder of time in a calendar year. A time frame may be set by default or by setting.

An income estimation component 342 may estimate income from one or more income sources. For example, a primary income estimation component 344 may estimate income related to a primary income source and a secondary income estimation component 346 may estimate income related to a secondary income source. A primary income estimation component 344 and/or secondary income estimation component 346 may estimate income for one or more income sources, for instance, based on an income priority indicator for each income source. Some embodiments may include additional income estimation components (not shown). Income estimations generated by a primary income estimation component 344, a secondary income estimation component 346, and/or additional estimation components may be based on input data 302, including one or more of user data 304, historic income data 306, or approved income sources 308, custom income sources 310.

In some embodiments, a financial analyzer 204 may receive a selection of an employment opportunity and/or a product, such as included in an employment recommendation 326 and/or a product recommendation 328. Accordingly, an income estimation component 342 may estimate income based on using the employment opportunity and/or product as a supplementary and/or alternative source of income. In some embodiments, an income estimation may be based on the historic contributions of the same or similar income sources for other or similar users, based on user data 304. Income estimations generated by a primary income estimation component 344, a secondary income estimation component 346, and/or additional estimation components may thus be based on input data 302 including available products 316 and/or employment opportunities 320.

An income estimation component 342 may include estimated expenses in an income estimation. For example, an expense estimation component 348 may estimate expenses for the determined time frame. Historic expense data 312 may inform an expense estimation component 348.

In some embodiments, an income estimation component 342 may generate one or more estimations of expected irregular income sources. For example, an income estimation component 342 may include a bonus calculation component 350. A bonus calculation component 350 may estimate at least one bonus for a user based on one or more income sources. A bonus calculation component 350 may estimate a bonus based on past employment data and/or past bonuses received by a user, such as may be included in user data 304. Additionally, or alternatively, a bonus calculation component 350 may use user performance data 314 to estimate a bonus for a user. For example, user performance data 314 including positive reviews of a user by the user's co-workers may contribute to a higher estimated bonus, or negative reviews may contribute to a lower estimated bonus. In some embodiments, a bonus calculation component 350 may operate by logic similar in one or more ways to logic used to process supplementary income sources. For example, a bonus calculation component 350 may implement logic blocks 410, 412, 413, 414, 417, and/or 420 as described below with respect to FIG. 4.

An income estimation component 342 may base inclusion of income sources on an estimation of the reliability that income will be received from the respective income sources. An income reliability estimation component 352 may determine which income sources to include in an estimation and/or weight income amounts based on estimated reliabilities of respective income sources. In some embodiments, an income reliability estimation component 352 may generate scores and/or other indications of reliability for at least one income source. For example, an income source which has contributed the same amount of funds to an account at a regular interval for a significant period of time may have a high reliability score. In another example, an income source which has reliably contributed to the incomes of other users similar to the user may have a high reliability score. In a further example, an income source which has irregularly contributed to the income of a user may have a low reliability score.

In some embodiments, an estimated income from an income source with a low reliability score may be presented with a lower amount and/or with a warning based on the low reliability score. For example, an income reliability estimation component may assign a low reliability score to an income source that contributed $100 in a first time period, $0 in a second time period, and $1000 in a third time period. Accordingly, the income source may be estimated to contribute an amount greater than $0 but less than $1000 in a fourth time period based on the low reliability score.

An income estimation component 342 may generate an estimation of income flow based on one or more of a primary income estimation component 344, a secondary income estimation component 346, an expense estimation component 348, a bonus calculation component 350, or an income reliability estimation component 352. For example, an estimation of income flow may be based on a summation of estimated income flow in and out of an account associated with a user. In some embodiments, an estimation of income flow may comprise a flag and/or other indication that an estimated summation is positive, negative, and/or below a threshold.

One or more components of an income estimation component 342 may use machine learning, pattern fitting, and/or at least one model in estimating a component of an estimation of income flow. For example, a primary income estimation component 344 may estimate income from a primary source based creating and using a model of historic income data relating to the primary source. In another example, a bonus calculation component 350 may include a model trained on user data 304 relating to an income source, a position, a user's employment, records of historic bonuses associated with employees of the income source, and/or other data. Accordingly, the bonus calculation component 350 may determine an estimated bonus payout based on the model. Similarly, any components of an income estimation component 342 may include and/or incorporate a model in generation of an estimation of income flow.

A financial analyzer 204 may comprise an employment recommendation component 354. An employment recommendation component 354 may generate one or more recommendations of employment for a user. In many embodiments, an employment recommendation component 354 may generate a recommendation of employment based on an estimation of income flow from an income estimation component 342 and/or a recommendation from a product recommendation component 356.

An employment recommendation component 354 may generate a recommendation of employment based on one or more aspects of input data 302, for example, user data 304 and/or employment opportunities 320. In some embodiments, an employment recommendation component 354 may determine that an estimation of income flow, for example, from an income estimation component 342, is below a threshold. For example, the estimation of income flow may be a negative value. Based on the estimation of income flow, the employment recommendation component 354 may access one or more employment opportunities 320.

An employment recommendation component 354 may base a recommendation on user data 304 pertinent to the user request 334. For example, an employment recommendation component 354 may base a recommendation including one or more employment opportunities 320 on a user's credit history, employment history, schedule, skill set, and/or another factor.

In some embodiments, an employment recommendation component 354 may access employment opportunities 320 based on the interaction of similar users with those employment opportunities 320, as determined based on user data 304. For example, an employment recommendation component 354 may selectively access and/or filter employment opportunities 320 based on historic interaction with those employment opportunities 320 by users with similar estimations of income flow, credit history, employment history, schedule, skill set, and/or another factor.

An employment recommendation component 354 may base a recommendation on machine learning, pattern fitting, and/or at least one model based on user data 304. For example, an employment recommendation component 354 may use a model including employment opportunities which a user similar to the user of the request 334 may be likely to interact with. Based on the model, the employment recommendation component 354 may generate a recommendation including an employment opportunity and/or position.

An employment recommendation component 354 may generate a recommendation including one or more employment opportunities 320 based on an estimation of income flow. For example, a recommendation may include at least one employment opportunity of employment opportunities 320 based on a determination that income gain estimated from the employment opportunity would increase an estimation of income flow to be above a threshold. A threshold may be based on a default setting, a user setting, historic estimated income and/or expense data, or another factor. In some embodiments, a recommendation from an employment recommendation component 354 may include multiple employment opportunities 320 that individually and/or together are estimated to correspond to an income increase to bring an estimation of an income flow above a threshold. The employment recommendation component 354 may include an employment opportunity in a recommendation based on a determination that the employment opportunity would increase an estimated income flow to be above a threshold in addition to and/or in place of at least one income source associated with the user.

A recommendation from an employment recommendation component 354 may include contact information for an employment opportunity, a link to a website for the employment opportunity, and/or other data to enable a customer to take advantage of an employment opportunity. A recommendation may additionally, or alternatively, include information useful for determining the estimated value of an employment opportunity. For example, the recommendation may include an estimation of income flow including income from the employment opportunity, scheduling requirements of the income opportunity, reviews of employees associated with the employment opportunity, and/or a reliability estimated for the employment opportunity.

A financial analyzer 204 may include a product recommendation component 356. A product recommendation component 356 may generate a one or more recommendations of a product for a user. In many embodiments, a product recommendation component 356 may generate a recommendation of a product based on an estimation of income flow from an income estimation component 342 and/or a recommendation from an employment recommendation component 354.

A product recommendation component 356 may generate a recommendation of a product based on one or more aspects of input data 302, for example, user data 304, available products 316 and/or product qualifications 318. In some embodiments, a product recommendation component 356 may determine that an estimation of income flow, for example, from an income estimation component 342, is below a threshold. For example, the estimation of income flow may be a negative value. Based on the estimation of income flow, the product recommendation component 356 may access one or more available products 316.

A product recommendation component 356 may base a recommendation on user data 304 pertinent to the user request 334. For example, a product recommendation component 356 may base a recommendation including one or more available products 316 on a user's financial history, credit history, historic engagement with available products 316, schedule, estimated eligibility, account balance, and/or another factor. In some embodiments, a product recommendation component 356 may include a product in a recommendation based on a determination that the product is associated with the user request meets. For example, the product may be associated with one or more product qualifications 318. The product recommendation component 356 may include the product in a recommendation based on a determination that the one or more product qualifications 318 are met by user data 304 associated with the user of the user request.

In some embodiments, a product recommendation component 356 may access available products 316 based on the interaction of similar users with those available products 316, as determined based on user data 304. For example, a product recommendation component 356 may selectively access and/or filter available products 316 based on historic interaction with those available products 316 by users with similar estimations of financial history, credit history, historic engagement with available products 316, schedule, estimated eligibility, account balance, and/or another factor.

A product recommendation component 356 may base a recommendation on machine, pattern fitting, learning and/or at least one model based on user data 304. For example, a product recommendation component 356 may use a model including products which a user similar to the user of the request 334 may be likely to interact with. Based on the model, the product recommendation component 356 may generate a recommendation including a particular product.

A product recommendation component 356 may generate a recommendation including one or more available products 316 based on an estimation of income flow. For example, a recommendation may include at least one product of available products 316 based on a determination that the product would result in income gain sufficient to increase an estimation of income flow to be above a threshold. A threshold may be based on a default setting, a user setting, historic estimated income and/or expense data, or another factor. In some embodiments, a recommendation from an employment recommendation component 354 may include multiple products that individually and/or together are estimated to correspond to an income increase to bring an estimation of an income flow above a threshold.

In some embodiments, a product recommendation component 356 may generate a recommendation including one or more products based on one or more product qualifications 318 of another product. For example, a product recommendation component 356 may determine that a short-term loan would be sufficient to increase an estimation of income flow to be above a threshold, but, based on product qualifications 318 associated with the short-term loan, the product recommendation component 356 may recognize that the user needs to take a loan counseling course before being eligible to take advantage of the short-term loan. Accordingly, the product recommendation component 356 may include a loan counseling course in a recommendation in addition to or instead of the short-term loan.

A recommendation from a product recommendation component 356 may include contact information for a product, a link to a website for the product, and/or other data to enable a customer to take advantage of a product. A recommendation may additionally, or alternatively, include information useful for determining the estimated value of a product. For example, the recommendation may include an estimation of income flow including income from the product, scheduling requirements of the product, product reviews, and/or an estimated effect of the product for financial wellbeing.

A financial analyzer 204 may generate a financial estimation 358 based on one or more outputs from an income estimation component 342, an employment recommendation component 354, and/or a product recommendation component 356. A financial estimation may include one or more aspects of output data 322. In some embodiments, a financial analyzer 204 may include information relating to an estimated income flow, an employment recommendation, a product recommendation, or any combination thereof in response to an indicator in a received request 334. For example, a request 334 may indicate a requested analysis of employment opportunities with respect to an income flow. In another example, a request 334 may correspond to input received via button 122 as described with respect to FIG. 1B. Accordingly, a financial estimation 358 may include an output of an income estimation component 342 and an output of an employment recommendation component 354 but not a product recommendation component 356.

In some embodiments, one or more aspects of an income estimation component 342, an employment recommendation component 354, or a product recommendation component 356 may operate even if a result therefrom is not to be included in a financial estimation 358 per indicator in a request 334. Accordingly, a financial analyzer 204 may provide desired results based on a holistic analysis of available information. In other embodiments, one or more aspects of an income estimation component 342 an employment recommendation component 354, or a product recommendation component 356 may not operate if a result therefrom is not to be included in a financial estimation 358. Accordingly, processing efficiency may be improved.

Criteria for the generation of a financial estimation 358 by a financial analyzer 204 may be set by default, based on a user setting, selected by an enterprise, determined by information available to a financial analyzer 204, and/or otherwise customized. For example, a user setting may limit generation of a recommendation of employment from an employment recommendation component 354 to include only employment opportunities 320 and/or available products 316 taken advantage of by users with similar skill sets. In further examples, a user setting may broaden recommendations to include employment opportunities 320 and/or available products 316 that would require a schedule change of the user, that would require further skill or education, or that have been taken advantage of by users with dissimilar historic employment.

In many embodiments, one or more aspects of a financial estimation 358 may be displayed via a user interface 212, as described with respect to FIG. 2. For example, an employment recommendation of a financial estimation 358 may be displayed as a recommendation 162, 164, and/or 166 as described with respect to FIG. 1J. In another example, a product recommendation of a financial estimation 358 may be displayed as a recommendation 154, 155, and/or 156 as described with respect to FIG. 1I. In some embodiments, a financial analyzer 204 may generate a user notification for display via a user interface 212 based on one or more aspects of a financial estimation 358. For example, a notification may include indications of potential opportunities to increase an adjusted available income and/or indications of offers for financial products and/or services. The user interface 212 may receive interaction with one or more aspects of the financial estimation 358, such as interaction with a recommendation 162, 164, and/or 166. In some embodiments, a user interface 212 may be redirected and/or progressed based on the interaction. For example, a user interface 212 may redirect to an application for a position based on an interaction with recommendation 162.

Figure 4A:
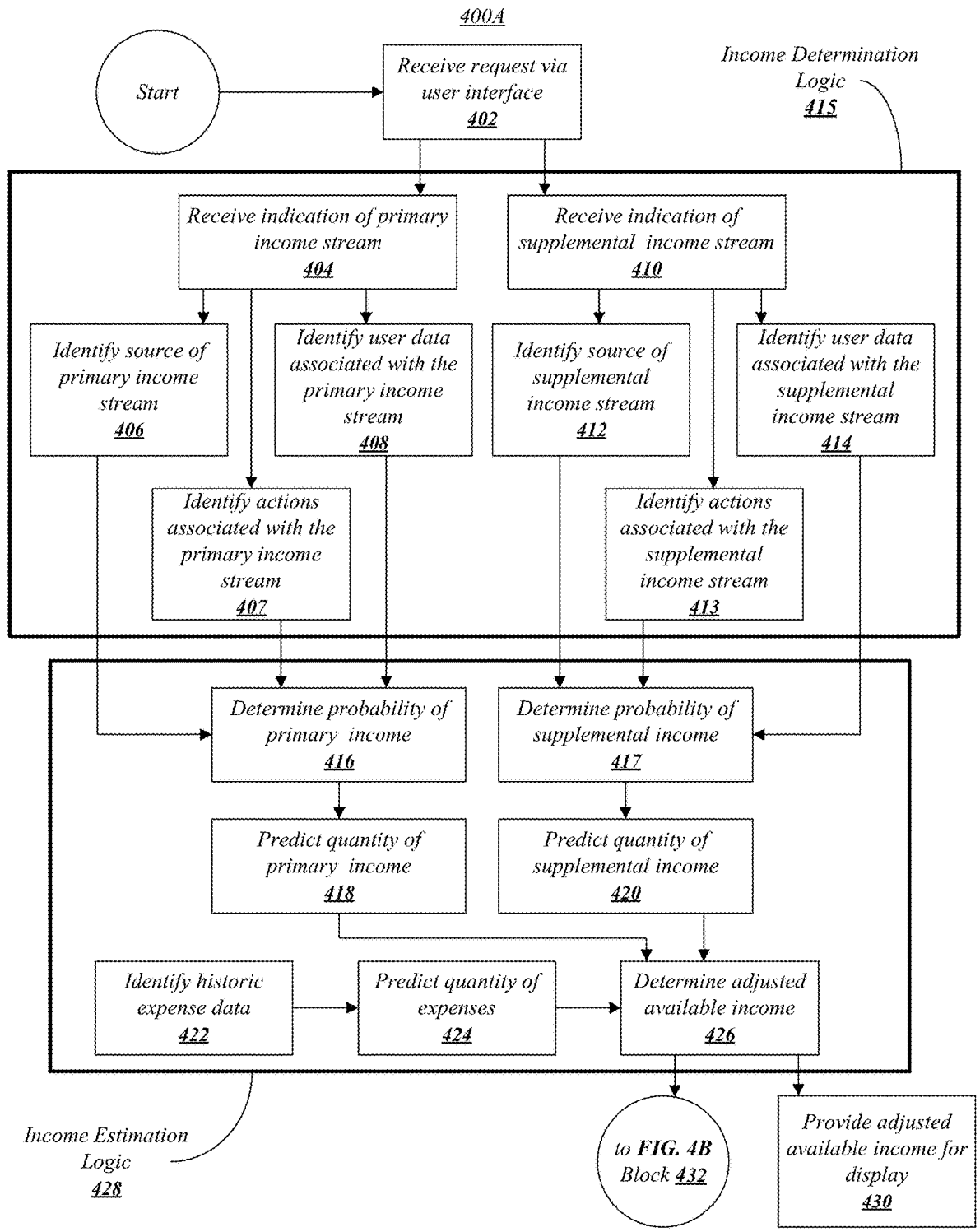
FIGS. 4A-B are flowcharts depicting financial recommendation techniques according to exemplary embodiments.
Figure 4B:
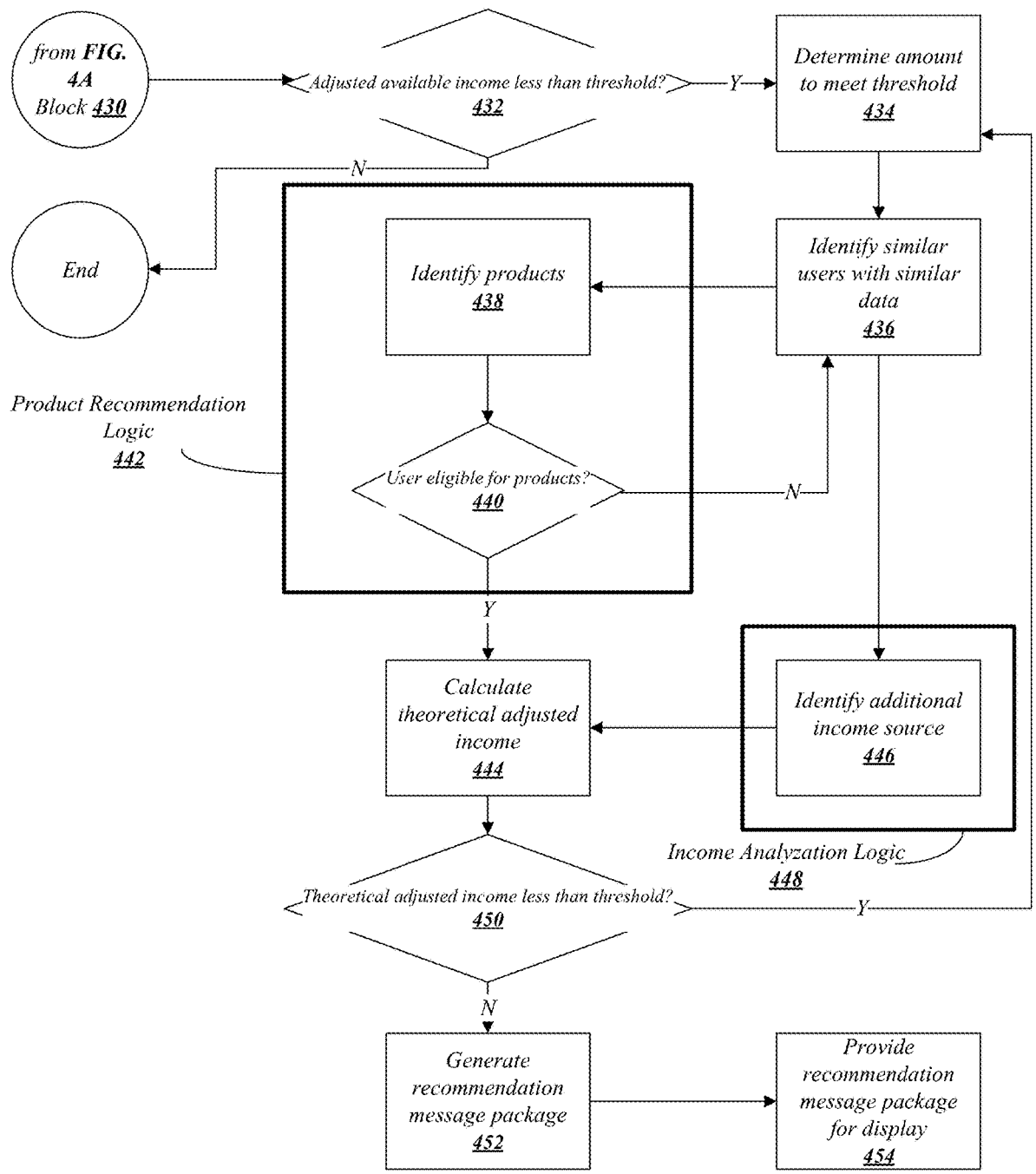
Figure 6:
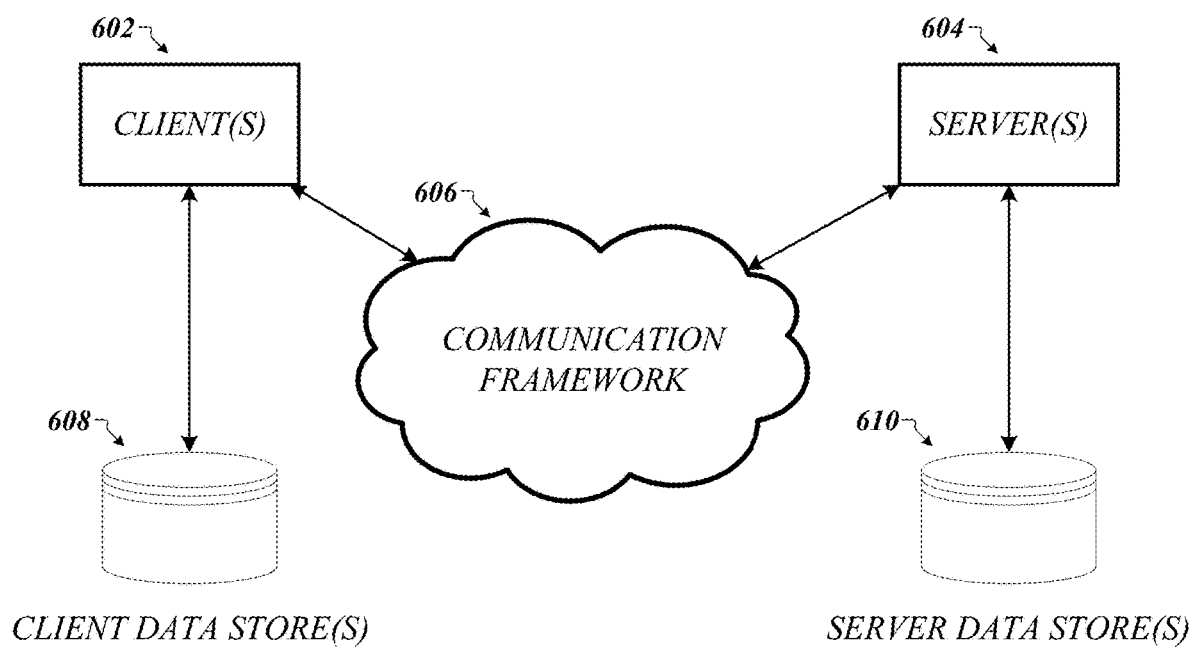
FIG. 6 is a block diagram depicting an exemplary communications architecture suitable for use with techniques described herein.

Next, exemplary logic 400A-B for estimating a net cash flow and/or providing recommendations based on the estimated net cash flow are described in connection with FIGS. 4A-4B. FIGS. 4A-4B organize the logic block depicted into various groups of logics (e.g., income determination logic 415, income estimation logic 428, product recommendation logic 442, income analyzation logic 448, etc.). In some embodiments, these logic modules may be provided on a client 602 or server 604, as shown in FIG. 6. In some embodiments, these logic modules may be provided on a processor 206 and/or in a financial analyzer 204, as shown in FIG. 2, although it is understood that such a configuration is not required. All the modules may be implemented in the same device or may be distributed across any number of devices. Various combinations of modules may be employed on a given device, or the logic of an individual module may be performed by different devices.

Processing may begin at block 402, in which a request is received via a user interface. A request may indicate an instruction to generate one or more financial estimations via a financial analyzer. A request may be, for example, request 334, as described in connection with FIG. 3B. A request may be received via a user interface, such as user interface 212 described with respect to FIG. 2. A request may be associated with a user and/or user account of a financial analyzer, for example, financial analyzer 204.

From block 402, processing may proceed to block 404. At block 404, logic may receive an indication of a primary income stream. In some embodiments, logic may receive an indication of a primary income stream as an information element received in input data 302, as described with respect to FIG. 3A. An indication of a primary income stream may correspond to a repeated contribution of income to a user account by a common source. For example, a primary income stream may correspond to wages earned from an employer, to payments made by an entity to the user account, or other source. In some embodiments, a request of block 402 may comprise an indication of a primary income stream. Accordingly, logic of blocks 402 and 404 may be performed concurrently or in the same step or steps.

In some embodiments, logic may identify an indication of a primary income stream based on a setting, user input, and/or historic data associated with the user and/or user account of block 402. For example, logic may identify repeated contributions above a threshold fund amount by a common source as an income source. A primary income stream may be identified from one or more income sources based on relative consistencies and/or values of contributions from the respective income sources. For example, logic may determine an indication of a primary income stream based on identification of a source of regular contributions with larger magnitudes than other sources of regular contributions.

From block 404, logic may hand off processing to block 406, block 407, and/or 408.

At block 406, logic may identify a source of a primary income stream. A source of a primary income stream may comprise a source identifier indicating a primary income stream. A source may be identified based on a setting, user input, and/or based on historic transactions in an account for the user. For example, transactions determined at block 404 and/or block 407 to be associated with a primary income source may include a common source identifier. In some embodiments, logic may receive one or more aspects of a source of a primary income stream as an information element received in input data 302, as described with respect to FIG. 3A. For example, a source of a primary income stream may be received as an aspect of approved income sources 308 and/or custom income sources 310. In some embodiments, multiple entities may be grouped and identified as a common source at block 406. For example, entities may belong to a common category and/or have a common tag, for example, a tag indicating income from a particular type of source, such as payments for salaried work and/or gig work. Examples of salaried work may include payments of regular amounts made based on defined payment cycles. Examples of income sources associated with gig work may include a ride hailing service, a rental service, a media streaming service, a content distribution service, or a social media service.

In some embodiments, logic at block 406 may identify additional data associated with a source identifier indicating a primary income stream. Additional data may comprise information useful for determining payments associated with a primary income stream. Additional data may be identified based on information received from an enterprise datastore 214 and/or a third-party datastore 216, as described with respect to FIG. 2. For example, additional data may comprise reports of an income source's historic wages for at least one position, for example, from a job information reporting database. In some embodiments, additional information may comprise an indication of a reliability, consistency, and/or a payment cycle associated with an income source. In some embodiments, logic may receive additional data as an information element received in input data 302, as described with respect to FIG. 3A. For example, additional data may be received in historic income data 306, approved income sources 308, and/or custom income sources 310.

At block 407, logic may identify actions associated with a primary income stream. Actions may be identified in data and correspond to received and/or estimated incoming funds. For example, an action may include a transaction record, a schedule entry of an employment shift, data corresponding to worked overtime, or another action relating to a primary income stream. In some embodiments, logic may receive an indication of at least one action as an information element received in input data 302, as described with respect to FIG. 3A. For example, actions may be received as historic income data 306. Actions may be completed, incomplete, or a combination thereof. For example, a completed action may include a received wage. In another example, an incomplete action may include an estimated wage that has not yet been received. Some embodiments may include logic to identify completed actions in a payment cycle, completed actions related to the payment cycle in a specified time period, or a combination thereof. Logic at block 407 may identify actions over multiple iterations of a specified time period and calculate an average number of completed actions in a specified time period.

Logic at block 408 may identify user data associated with a primary income stream. For example, user data identified at block 408 may comprise a position held by a user in association with an income source, a pay rate, a performance review, an indication of a user's employment history in association with an income source, or any combination thereof. In some embodiments, logic may receive an indication of user data as an information element received in input data 302, as described with respect to FIG. 3A. For example, data may be received as user data 304 and/or user performance data 314.

In many embodiments, logic may proceed from block 402 to block 410. Logic may hand off processing to block 410 alternative to or in addition to block 404. Processing may take place either at block 404 or block 410 first, or processing may take place at blocks 404 and 410 concurrently. At block 410, logic may receive an indication of at least one supplemental income stream. In some embodiments, a request of block 402 may comprise an indication of a supplemental income stream. Accordingly, logic of blocks 402 and 410 may be performed concurrently or in the same step or steps.

An indication of a supplemental income stream may correspond to a repeated contribution of income to a user account by a common source that is supplemental to a primary income stream. For example, a supplemental income stream may correspond to wages earned from an employer, to payments made by an entity to the user account, or other source. In many embodiments, a supplemental income stream may include income contributions that are regularly less in value than and/or less reliable than contributions of a primary income stream. A supplemental income stream may be identified based on a category of transaction, for example, of gig work. Examples of income sources associated with gig work may include a ride hailing service, a rental service, a media streaming service, a content distribution service, or a social media service.

In some embodiments, a supplemental income stream may comprise an irregular payment. In some embodiments, the supplemental income stream may be associated with a primary income stream. For example, a supplemental income stream may comprise an auxiliary bonus associated with a primary income source, such as a primary income bonus.

In other embodiments, logic may identify an indication of a supplemental income stream based on a setting, user input, and/or historic data associated with the user and/or user account of block 402. For example, logic may identify repeated contributions above and/or below a threshold fund amount by a common source as an income source. A supplemental income stream may be identified from one or more income sources based on relative consistencies and/or values of contributions from the respective income sources. For example, logic may determine an indication of a supplemental income stream based on identification of a source of regular contributions with smaller magnitudes than a primary income source but larger magnitudes than other sources of regular contributions. In some embodiments, logic may receive an indication of a supplemental income stream as an information element received in input data 302, as described with respect to FIG. 3A. For example, an indication of a supplemental income stream may be received in approved income sources 308 and/or custom income sources 310.

From block 410, logic may hand off processing to block 412, block 413, and/or block 414.

At block 412, logic may identify a source of a supplemental income stream. A source of a supplemental income stream may comprise a source identifier indicating a primary income stream. A source may be identified based on a setting, user input, and/or based on historic transactions in an account for the user. For example, transactions determined at block 410 and/or block 413 to be associated with a supplemental income source may include a common source identifier. In some embodiments, logic may receive a source of a supplemental income stream as an information element received in input data 302, as described with respect to FIG. 3A. For example, an indication of a supplemental income stream may be received in approved income sources 308 and/or custom income sources 310. In some embodiments, multiple entities may be grouped and identified as a common source at block 412. For example, entities may belong to a common category and/or have a common tag, for example, a tag indicating income from a particular type of source, such as payments for gig work.

In some embodiments, logic at block 412 may identify additional data associated with a source identifier indicating a supplemental income stream. Additional data may comprise information useful for determining payments associated with a supplemental income stream. Additional data may be identified based on information received from an enterprise datastore 214 and/or a third-party datastore 216, as described with respect to FIG. 2. For example, additional data may comprise reports of an income source's historic wages for at least one position, for example, from a job information reporting database. In some embodiments, additional information may comprise an indication of a reliability, consistency, and/or a payment cycle associated with an income source. If a supplemental income stream comprises an auxiliary bonus from an income source, additional data may comprise related auxiliary payout metrics. In some embodiments, logic may receive additional data relating to a supplemental income stream as an information element received in input data 302, as described with respect to FIG. 3A. For example, an indication of a supplemental income stream may be received in historic income data 306, approved income sources 308, and/or custom income sources 310.

At block 413, logic may identify actions associated with a supplemental income stream. Actions may be identified in data and correspond to received and/or estimated incoming funds. For example, an action may include a transaction record, a schedule entry of an employment shift, data corresponding to worked overtime, or another action relating to a supplemental income stream. In some embodiments, logic may receive an indication of at least one action as an information element received in input data 302, as described with respect to FIG. 3A. For example, an indication of at least one action may be received in approved historic income data 306. Actions may be completed, incomplete, or a combination thereof. For example, a completed action may include a received wage. In another example, an incomplete action may include an estimated wage that has not yet been received. Some embodiments may include logic to identify completed actions in a payment cycle, completed actions related to the payment cycle in a specified time period, or a combination thereof. Logic at block 413 may identify actions over multiple iterations of a specified time period and calculate an average number of completed actions in a specified time period.

Logic at block 414 may identify user data associated with a supplemental income stream. For example, user data identified at block 408 may comprise a position held by a user in association with an income source, a pay rate, a performance review, an indication of a user's employment history in association with an income source, or any combination thereof. In some embodiments, logic may receive user data as an information element received in input data 302, as described with respect to FIG. 3A. For example, user data associated with a supplemental income stream may be received in user data 304 and/or user performance data 314.

Together, logic of blocks 404, 406, 407, 410, 412, and 413 make up income determination logic 415. It is understood that while aspects of income determination logic 415 are illustrated singularly for the sake of simplicity, logic of any block may be performed in any number of iterations. In some embodiments, logic may receive indications of multiple primary and/or supplemental income streams, thereby performing the steps of blocks 404 and/or 410 respectively multiple times. For example, logic may receive an indication of a secondary supplemental income stream at block 410 and accordingly proceed to logic of blocks 412 and 413. Subsequently or simultaneously, logic may receive an indication of a third, fourth, or further supplemental income stream at block 410. Accordingly, logic may perform steps of blocks 412 and 413 for each received income stream indication. Logic may perform stems in series or in parallel. One or more aspects of income determination logic 415 may be performed by a processor 206 and/or financial analyzer 204, as described with respect to FIG. 2.

From block 406, 407, and/or block 408, processing may progress to block 416. At block 416, logic may determine a probability of a primary income. The probability of the primary income may comprise a likelihood that a payment will be completed by a primary income source. Logic may determine a probability based on a source of a primary income stream as determined in block 406, actions associated with the primary income stream as determined in block 407, user data associated with the primary income stream, as determined in block 408, or any combination thereof. For example, logic may calculate a probability of a future payment from a primary income source based on third-party reports relating to payments by the primary income source, historic actions associated with the primary income source, whether the actions are completed and/or average completed actions, an amount associated with historic transactions from the primary income source, a calculated reliability and/or consistency of historic payments, or any combination thereof.

Logic may determine a probability of primary income in association with a specified time period. A specified time period may be determined by setting, received user input, historic transaction data, and/or other data associated with the primary income source. For example, logic may identify a pattern in timestamps of historic transaction data associated with the primary income source, wherein the pattern indicates a payment cycle. Accordingly, logic may determine a specified time period based on the identified payment cycle.

If logic, via block 404, received indications of multiple primary income streams, then logic of block 416 may be performed separately for each primary income stream or once for all identified primary income streams.

From block 416, processing may progress to block 418. At block 418, logic may estimate and/or predict a quantity of primary income. Logic may predict a quantity of primary income based on a source of and/or at least one action associated with a primary income stream, as determined by income determination logic 415. A prediction of a quantity of primary income may be based on a probability associated with receiving at least one payment from a primary income source, as determined in block 416. If logic, via block 404, received indications of multiple primary income streams, then logic of block 418 may be performed separately for each primary income stream or once for all identified primary income streams. For example, logic of block 418 may predict a quantity of primary income based on multiple primary income sources. A prediction of a quantity of primary income may include an estimate of incoming funds from at least one primary income source over a specified time period, wherein the time period is determined based on a default setting, a user setting, and/or other measurement setting. For example, a time period may be specified based on a recurrent payment cycle.

From block 412, 413, and/or 414, processing may progress to block 417. At block 417, logic may determine a probability of a supplementary income. The probability of the supplementary income may comprise a likelihood that a payment will be completed by a supplementary income source. Logic may determine a probability based on a source of a supplementary income stream as determined in block 412, actions associated with the supplementary income stream as determined in block 413, user data associated with the supplementary income stream, as determined in block 414, or any combination thereof. For example, logic may calculate a probability of a future payment from a supplementary income source based on third-party reports relating to payments by the supplementary income source, historic actions associated with the supplementary income source, whether the actions were completed and/or average completed actions, an amount associated with historic transactions from the supplementary income source, a calculated supplementary and/or consistency of historic payments, reviews of the user's performance associated with the supplementary income source, or any combination thereof. For example, if a secondary income stream corresponds to an auxiliary bonus, logic at block 417 may determine a probability of a user receiving an amount as a bonus based on historic bonuses received from the corresponding income source, time spent in a position associated with the income source, performance reviews for the user associated with the income source, and reports of bonuses received by similar employees of the income source.

Logic may determine a probability of supplementary income in association with a specified time period. A specified time period may be determined by setting, received user input, historic transaction data, and/or other data associated with an income source. For example, logic may identify a pattern in timestamps of historic transaction data associated with an income source, wherein the pattern indicates a payment cycle. Accordingly, logic may determine a specified time period based on the identified payment cycle.

If logic, via block 410, received indications of multiple supplementary income streams, then logic of block 417 may be performed separately for each supplementary income stream or once for all identified supplementary income streams.

Processing may progress from block 417 to block 420. At block 420, logic may estimate and/or predict a quantity of supplemental income. Logic may predict a quantity of supplemental income based on a source of and/or at least one action associated with a supplemental income stream, as determined by income determination logic 415. A prediction of a quantity of supplemental income may be based on a probability associated with a supplemental income, as determined in block 417. If logic, via block 410, received indications of multiple supplemental income streams, then logic of block 420 may be performed separately for each supplemental income stream or once for all identified supplemental income streams. For example, logic of block 420 may predict a quantity of supplemental income based on multiple supplemental income sources. A prediction of a quantity of supplemental income may include an estimate of incoming funds from at least one supplemental income source over a time period, wherein the time period is determined based on a default setting, a user setting, and/or other measurement setting. In many embodiments, the time period associated with the prediction of a quantity of supplemental income may be the same time period associated with a prediction of a quantity of primary income.

At block 422, logic may identify historic expense data. Historic expense data may be identified as historic transactions resulting in a deduction from funds in an account. In some embodiments, historic expense data may be identified in association with one or more entities associated with expenditures.

Based on historic expense data identified at block 422, logic may predict a quantity of expenses at block 424. Logic may predict a quantity of expenses based on a value and/or recurrence of one or more historic expenses. In some embodiments, reliability of expenses may be based on association of expenditures with one or more entities, and the prediction of the quantity of expenses may be based on the reliability. Logic may use machine learning, one or more models, pattern fitting, and/or other measure to estimate a quantity of expenses for the prediction. A prediction of a quantity of expenses may include an estimate of expenses for a particular time period. The time period of the prediction may be based on a default setting, a user preference, and/or another setting. In many embodiments, a time period of the prediction may be the same as a time period associated with a prediction of a quantity of primary income, of supplemental income, or both.

From block 424, processing may be handed off to block 426. At block 426, logic may determine an adjusted available income. An adjusted available income may be based on one or more of determinations of logic at blocks 418, 420, or 424. For example, an adjusted available income may include a summation of predicted quantities of primary income, supplemental income, and/or expenses. In some embodiments, data may be included in an adjusted available income based on a default setting, a user setting, or other selection. For example, a user setting may specify that an adjusted available income should be calculated based on a primary income prediction and an expense prediction, but not based on a supplemental income prediction. In another example, a user interface 212 as described with respect to FIG. 2 may receive instructions that cause an adjusted available income to be calculated based on a supplemental income prediction and an expense prediction, but not based on a primary income prediction.

Together, logic of blocks 418, 420, 422, 424, and 426 may make up income estimation logic 428. One or more aspects of income estimation logic 428 may be performed by a processor 206 and/or financial analyzer 204, as described with respect to FIG. 2.

In some embodiments, processing may progress from block 426 to block 430. At block 430, logic may provide an adjusted available income for display, for example, via a user interface 212 as described with respect to FIG. 2. As described with respect to FIG. 1A, an adjusted available income may be displayed as predicted net flow 113.

Processing may be handed off from block 426 to block 432. As described in exemplary logic 400B, logic may determine at block 432 whether an adjusted available income is less than a threshold. A threshold may be determined by a setting such as a default setting or a user setting. For example, a threshold may be $0, in which an adjusted available income less than the threshold may indicate an estimation that estimated expenses for a user are greater than estimated income. In another example, a threshold may be a positive value, in which an adjusted available income less than the threshold may indicate that an estimated net gain of funds may not meet a user's savings goal.

If logic at block 432 determines that an adjusted available income is not less than the threshold, processing may end. Otherwise, processing may progress to block 434. At block 434, logic may determine an amount needed to meet the threshold based on a comparison of the adjusted available income to the threshold. For example, an amount needed to meet the threshold may be a difference between an adjusted available income and the threshold.

From block 434, processing may proceed to block 436. At block 436, logic may identify users with similar data. Logic may use user data 304 to identify users with similar data, as described with respect to FIG. 3A. For example, logic may compare data associated with a user to data associated with other users. In another example, logic may identify similar users and/or users with a similar financial history to a user based on a model. Logic may use financial history, employment records, skill sets, defined categories, or other data to identify similar users.

Some embodiments may skip the processing of block 438 or determine that all users in a category and/or associated with a financial analyzer may be similar. In these embodiments, processing may proceed directly from block 434 to block 438 and/or block 446. Otherwise, processing may be handed off from block 436 to block 438 and/or block 446.

At block 438, logic may identify products. Products may include at least one good and/or service useful for achieving a financial end. For example, a good may be a loan, a mortgage, a financial grant, an investment account, and/or another product offered by an entity. A service may be, for example, a financial counseling class. Logic may identify products based on an amount to meet a threshold, as described with respect to block 434, based on the engagement of similar users with products, wherein the similar users are those determined in block 436, based on a requirement of another product or an income source, and/or other data as described herein.

Processing may be passed from block 438 to block 440. At block 440, logic may determine whether a user is eligible for the products identified in block 438. The determination may be based on product qualifications 318 associated with the products, user data 304, an account history, other data described herein, or any combination thereof. Logic may determine whether the user is eligible for the products based on a comparison of data associated with the user to data associated with the product and/or requirements for the product.

If logic determines that the user is eligible for the products, processing may progress to block 444. Otherwise, processing may return to block 434 or block 436. Next, logic may re-enter logic of block 438 to select alternative products. Additionally, or alternatively, logic may progress to block 446.

Logic of blocks 438 and 440 may make up product recommendation logic 442. A financial analyzer 204 and/or a processor 206, such as described in connection with FIG. 2, may perform product recommendation logic 442.

At block 444, logic may calculate a theoretical adjusted income. The theoretical adjusted income may be a combination of an adjusted available income with the effects of the products for which the user is determined to be eligible in block 440.

At block 446, logic may identify at least one additional income source. The at least one additional income source may be selected, for example, from employment opportunities 320 based on information such as the amount determined in block 434 to be needed to meet a threshold, user experience and availability as found in user data 304, and/or requirements of the at least one additional income source. Logic of block 446 may make up income analyzation logic 448, which may be implemented by a processor 206 and/or a financial analyzer 204, as described in connection with FIG. 2.

In some embodiments, logic of block 446 may be implemented with a check of user eligibility and/or availability, as illustrated with respect to product recommendation logic 442 in block 440. In the case that a user is ineligible and/or unable to take advantage of the additional income source identified in block 446, logic may return to block 436 or block 434 as described above. Otherwise, processing may progress to block 444. Alternatively, logic may be implemented in a single step, where at least one additional income source is identified in block 446 based on user eligibility and/or availability. For example, an income source may only be identified in block 446 based on a comparison of the user's qualifications with the income source's requirements. A determination that the income source's requirements are met by the user's qualifications may indicate that the user is a good candidate for the income source, and the income source may be accordingly identified in block 446. Similarly, blocks 438 and 440 of product recommendation logic 442 may be implemented in a common step.

Logic may progress from income analyzation logic 448 to block 444. In this case, a calculation of a theoretical adjusted income at block 444 may include the effects of the additional income source identified in block 446 in addition to or alternative to the effects of the products identified in block 438. For example, logic at block 444 may calculate a theoretical adjusted income as a combination of an adjusted available income with estimated income associated with an income source identified at block 446.

From block 444, logic may proceed to block 450. At block 450, logic may determine whether a theoretical adjusted income is less than a threshold. In many embodiments, the threshold of block 450 may be the same threshold of block 432. If the theoretical adjusted income is determined to be less than the threshold, logic may implement steps to identify at least one further product and/or income source to supplement the adjusted available income. Specifically, logic may enter steps described with respect to 434.

In some embodiments, logic may return to block 434 while maintaining the effect of the at least one product and/or income source analyzed at block 450. In other words, the theoretical adjusted income of block 450 may be treated as an adjusted available income of block 432. The effects of another product and/or income source subsequently identified by respective logic at block 438 and/or 446 may be added to the newly assumed adjusted available income.

In some embodiments, logic may return to block 434 after disregarding the effect of the at least one product and/or income source analyzed at block 450. Accordingly, logic at block 438 and/or block 446 may identify at least one product and/or income source as a replacement for that previously determined at block 450 to be insufficient to raise the theoretical available income above the threshold.

Logic may continue to loop through blocks 434 through 450 until a theoretical adjusted income is determined to not be less than the threshold amount. Logic may identify products, additional income sources, or any combination thereof. In some embodiments, a setting or user selection may be received which determines whether logic identifies products, additional income sources, or both. For example, a request 334 may be received which includes an indication that logic should identify an additional income source but not a product.

In some embodiments, a setting or user selection may be received which includes criteria for which products and/or income sources are identified at respective logic blocks 438 and/or 446. For example, a request 334 may include an indication of user availability. In another example, a request 334 may include an instruction to only identify a single additional income source, or a combination of up to a certain number of products and/or additional income sources. If a combination of products and/or additional income sources cannot be identified according to criteria at respective blocks 438 and/or 446 which will contribute to a theoretical adjusted income not being less than the threshold, logic may generate an alert, for example, for display via a user interface 212. Accordingly, a user interface 212 may receive subsequent instructions relating to criteria for blocks 438 and/or 446, for example, via a request 334. Exemplary logic 400A-B may then be restarted considering the updated instructions.

If, at block 450, the theoretical adjusted income is determined to not be less than the threshold, then processing may progress to block 452. At block 452, logic may generate a recommendation message package. A recommendation message package may comprise one or more aspects of output data 322 and/or a financial estimation 358, as described with respect to FIG. 3A. For example, a recommendation package may include at least one recommended product, at least one recommended additional income source, or any combination thereof as determined at block 450 to contribute to a theoretical adjusted income exceeding or being equal to a threshold.

Additionally, or alternatively, a recommendation message package may include information relating to an included product and/or additional income source. For example, a recommendation message package may include an effect of a product and/or additional income source on an adjusted available income, a theoretical adjusted income, an estimated salary, a schedule requirement, location information, requirements for a product and/or additional income source, contact information helpful for taking advantage of the product and/or additional income source, or any combination thereof.

In some embodiments, a recommendation message package may include multiple recommendations, each comprising one or more products and/or additional income sources. For example, logic of blocks 432 through 450 may be repeated to generate multiple recommendations, each comprising one or more products and/or additional income sources sufficient to cause a theoretical adjusted income to be greater than or equal to the threshold.

Processing may progress from block 452 to block 454. At block 454, logic may provide the recommendation message package for display, for example, via a user interface 212 as described with respect to FIG. 2. For example, aspects of a recommendation message package may be displayed as a recommendation 162, 164, and/or 166 as described with respect to FIG. 1J. In another example, aspects of a recommendation message package may be displayed as a recommendation 154, 155, and/or 156 as described with respect to FIG. 1I.

In some embodiments, processing as illustrated in exemplary logic 400B may progress from block 432 to 434 even if an adjusted available income is not less than the threshold. For example, a request 334 as described in connection with FIG. 3B may include an indication that a number of products and/or additional income sources should be generated without regards to a certain income threshold. Accordingly, products and/or additional income sources may be identified in respective blocks 438 and/or block 446 based on a comparison of products and/or income sources. For example, products and/or income sources may be identified based on having a comparatively higher effect on financial health and/or a theoretical adjusted income, a comparatively higher effect on financial health and/or a theoretical adjusted income given requirements of the product and/or income source, or other measure. Accordingly, a user may be permitted to access contents of a recommendation message package which may affect financial wellbeing without the prerequisite of having an adjusted available income less than a threshold. In some embodiments, a product and/or income source may be identified based on a score of one or more of financial impact, qualification requirement, schedule requirement, travel requirement, or other factor. Factors may be weighted based on a setting and/or user input.

Figure 5:
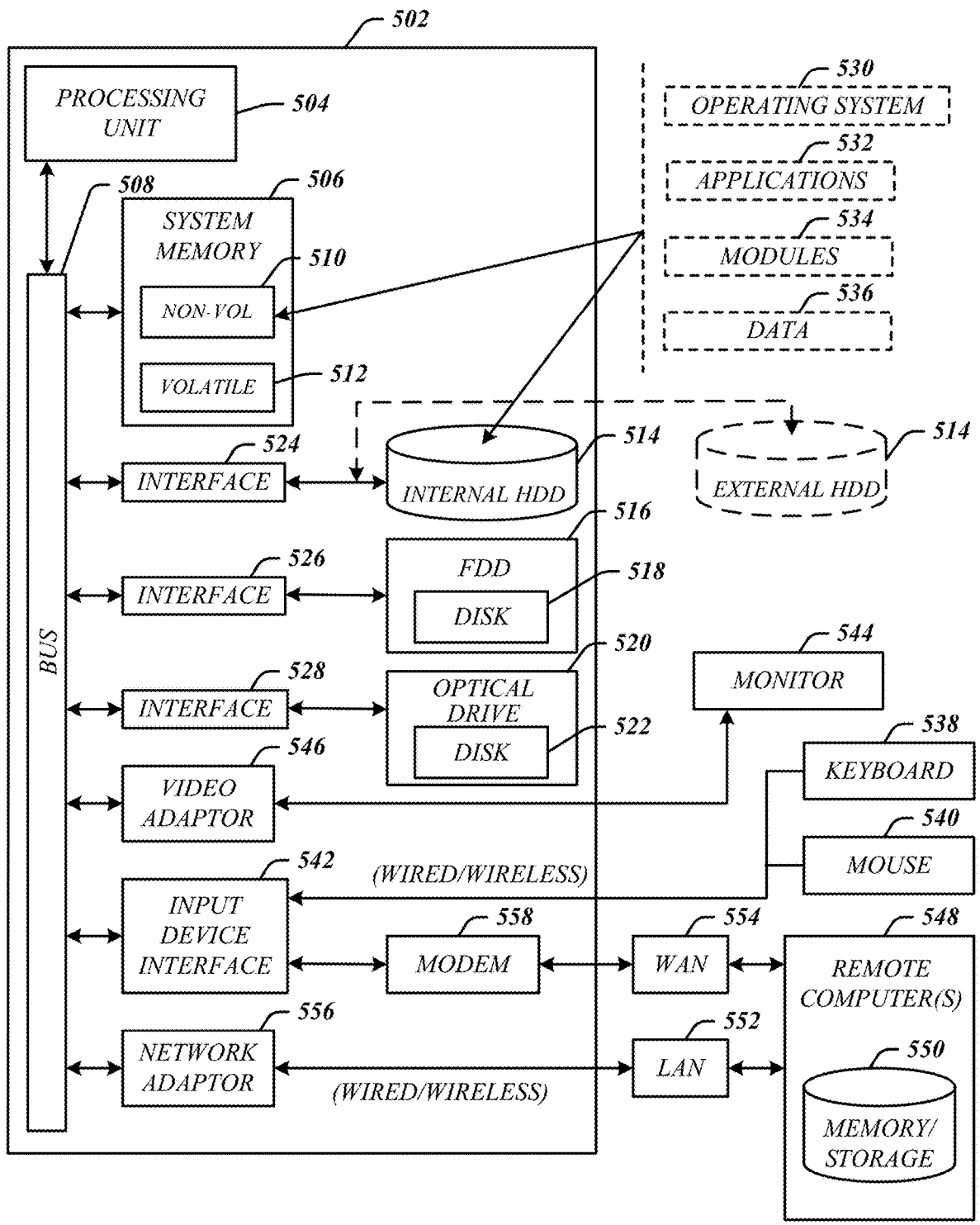
FIG. 5 is a block diagram depicting an exemplary computing architecture for use with techniques described herein.

FIG. 5 illustrates an embodiment of an exemplary computing architecture 500 that may be suitable for implementing various embodiments as previously described. In various embodiments, the computing architecture 500 may comprise or be implemented as part of an electronic device. In some embodiments, the computing architecture 500 may be representative, for example, of one or more component described herein. In some embodiments, computing architecture 500 may be representative, for example, of a computing device that implements or utilizes one or more of a client device 202, a financial analyzer 204, an enterprise datastore 214, a third-party datastore 216, and/or one or more techniques described herein. Embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 comprises a processing unit 504, a system memory 506 and a system bus 508. The processing unit 504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 504.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. In some embodiments, system memory 506 may include main memory. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and Institute of Electrical and Electronics Engineers (IEEE) 694 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include or implement, for example, the various techniques, applications, and/or components described herein.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 542 that is coupled to the system bus 508, but can be connected by other interfaces such as a parallel port, IEEE 994 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. In various embodiments, one or more migrations may occur via the networked environment. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

FIG. 6 illustrates a block diagram of an exemplary communications architecture 600 suitable for implementing various embodiments as previously described, such as virtual machine migration. The communications architecture 600 includes various common communications elements, such as a transmitter, receiver, transceiver, radio, network interface, baseband processor, antenna, amplifiers, filters, power supplies, and so forth. The embodiments, however, are not limited to implementation by the communications architecture 600.

As shown in FIG. 6, the communications architecture 600 comprises includes one or more clients 602 and servers 604. In some embodiments communications architecture may include or implement one or more portions of components, applications, and/or techniques described herein. For example, a client device 202 as described in connection to FIG. 2 may operate as a client 602. In another example, a financial analyzer 204 as described with respect to FIG. 2 may operate on a server 604. The clients 602 and the servers 604 are operatively connected to one or more respective client data stores 608 and server data stores 610 that can be employed to store information local to the respective clients 602 and servers 604, such as cookies and/or associated contextual information. In various embodiments, any one of servers 604 may implement one or more of logic flows or operations described herein in conjunction with storage of data received from any one of clients 602 on any of server data stores 610. In one or more embodiments, one or more of client data store(s) 608 or server data store(s) 610 may include memory accessible to one or more portions of components, applications, and/or techniques described herein.

The clients 602 and the servers 604 may communicate information between each other using a communication framework 606. The communications framework 606 may implement any well-known communications techniques and protocols. The communications framework 606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 602 and the servers 604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various users or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The invention claimed is:

1. At least one machine-readable storage medium comprising instructions that when executed by a processor at a computing platform, cause the processor to:
   receive, at a financial analyzer, a first information element from a user device, the first information element comprising indications of a first income stream, wherein the first income stream is an irregular income stream;
   identify a source for the first income stream;

establish, via a network interface, an authenticated communication channel with an application programming interface (API) associated with the source;

receive a data package relating to the source from a third-party datastore via the authenticated channel established with the API, the data package comprising an indication of actions related to the first income stream;

predict a supplemental income over a specified time period for the first income stream based in part on the actions related to the source;

determine a probability of the supplemental income based in part on the source and the actions;

receive a second information element, the second information element comprising indications of a primary income for the specified time period;

derive an adjusted available income based in part on the supplemental income, the probability of the supplemental income, and the primary income; and send the adjusted available income to the user device.

2. The at least one machine-readable storage medium of claim 1, wherein the source comprises a ride hailing service, a rental service, a media streaming service, a content distribution service, or a social media service.

3. The at least one machine-readable storage medium of claim 2, wherein the data package comprises indications of average completed actions in a payment cycle, completed actions related to the payment cycle in the specified time period, or both average completed actions in a payment cycle and completed actions related to the payment cycle in the specified time period.

4. The at least one machine-readable storage medium of claim 3, comprising instructions that further cause the processor to determine the probability of the quantity of supplemental income based in part on the source, the actions, and whether the actions are completed actions or average completed actions, or both average and completed actions.

5. The at least one machine-readable storage medium of claim VW, wherein the source comprises a primary income bonus, the media comprising instructions that further cause the processor to:

receive the data package comprising indications of reviews of a user associated with the primary income bonus; and determine the quantity of supplemental income based in part on the reviews.

6. The at least one machine-readable storage medium of claim 5, comprising instructions that further cause the processor to:

determine auxiliary bonus payout metrics related to the primary income source; and determine the quantity of supplemental income further based in part on the auxiliary bonus payout metrics.

7. The at least one machine-readable storage medium of claim 5, comprising instructions that further cause the processor to generate a user notification comprising indications of potential opportunities to increase the adjusted available income.

8. The at least one machine-readable storage medium of claim 5, comprising instructions that further cause the processor to generate a user notification comprising indications of offers for financial services.

9. An apparatus, comprising:
an interconnect to connect to a network;
a processor coupled to the interconnect; and
memory coupled to the processor, the memory comprising instructions that when executed by the processor cause the processor to:

receive, via the interconnect, a first information element from a user device, the first information element comprising indications of a first income stream, wherein the first income stream is an irregular income stream;

identify a source for the first income stream based on the indications of the first income stream;

establish, via the interconnect, an authenticated communication channel with an application programming interface (API) associated the source;

receive, via the interconnect, a data package relating to the source from a third-party datastore via the authenticated channel established with the API, the data package comprising an indication of actions related to the first income stream;

predict a supplemental income over a specified time period for the first income stream based in part on the actions related to the source;

determine a probability of the supplemental income based in part on the source and the actions;

receive a second information element, the second information element comprising indications of a primary income for the specified time period;

derive an adjusted available income based in part on the supplemental income, the probability of the supplemental income, and the primary income; and provide the adjusted available income to the user device.

10. The apparatus of claim 9, wherein the source comprises a ride hailing service, a rental service, a media streaming service, a content distribution service, or a social media service, and wherein the third information element comprising indications of average completed actions in a payment cycle, completed actions related to the payment cycle in the specified time period, or both average completed actions in a payment cycle and completed actions related to the payment cycle in the specified time period.

11. The apparatus of claim 9, comprising instructions that further cause the processor to determine the probability of the quantity of supplemental income based in part on the source, the actions, and whether the actions are completed actions or average completed actions, or both average and completed actions.

12. The apparatus of claim 9, wherein the source comprises a primary income bonus, the memory comprising instructions that further cause the processor to:

receive the data package comprising indications of reviews of a user associated with a primary income bonus; and determine the quantity of supplemental income based in part on the reviews;

determine auxiliary bonus payout metrics related to the primary income source;

determine the quantity of supplemental income further based in part on the auxiliary bonus payout metrics; and generate a user notification comprising indications of potential opportunities to increase the adjusted available income; or generate a user notification comprising indications of offers for financial services.

13. A computer-implemented method, comprising:
receiving, at financial analyzer on a server, a first information element, the first information element comprising indications of a first income stream;

identifying a source for the first income stream based on the indications of a first income stream;
establish, via an interconnect, an authenticated communication channel with an application programming interface (API) associated the source;
predicting a supplemental income over a specified time period for the first income stream based in part on the authenticated communication channel established with the API;
receiving a second information element, the second information element comprising indications of a primary income for the specified time period;
deriving an adjusted available income based in part on the supplemental income and the primary income; and
providing the adjusted available income to a user interface for display.

14. The computer-implemented method of claim 13, wherein the source comprises a ride hailing service, a rental service, a media streaming service, a content distribution service, or a social media service, and wherein the data package comprises indications of average completed actions in a payment cycle, completed actions related to the payment cycle in the specified time period, or both average completed actions in a payment cycle and completed actions related to the payment cycle in the specified time period, the method comprising determining the probability of the quantity of supplemental income based in part on the source, the actions, and whether the actions are completed actions or average completed actions, or both average and completed actions.

15. The computer-implemented method of claim 13, comprising:
receiving the data package comprising indications of reviews of a user associated with a primary income bonus;
determining the quantity of supplemental income based in part on the reviews,
determining auxiliary bonus payout metrics related to the primary income source; and
determining the quantity of supplemental income further based in part on the auxiliary bonus payout metrics;
generating a user notification comprising indications of potential opportunities to increase the adjusted available income; and
generating a user notification comprising indications of offers for financial services.

* * * * *